United States Patent [19]
Wang et al.

[11] Patent Number: 6,119,937
[45] Date of Patent: Sep. 19, 2000

[54] INFORMATION REPRODUCTION SYSTEM, INFORMATION RECORDING SYSTEM AND INFORMATION RECORDING MEDIUM UTILIZING AN OPTICALLY READABLE DOT CODE

[75] Inventors: Kangda Wang, Chofu; Kazuo Sonobe, Hidaka, both of Japan

[73] Assignee: Olympus Optical Co., Ltd., Tokyo, Japan

[21] Appl. No.: 08/626,076

[22] Filed: Apr. 1, 1996

[30] Foreign Application Priority Data

Apr. 4, 1995 [JP] Japan .................................. 7-078842

[51] Int. Cl.[7] .............................. G06K 9/38; G06K 19/06
[52] U.S. Cl. .......................... 235/454; 235/462; 235/472; 235/494; 371/37.8; 371/37.9
[58] Field of Search .................................. 235/462, 472, 235/494, 454; 371/37.8, 37.9, 6; 382/51

[56] References Cited

U.S. PATENT DOCUMENTS

| | | | |
|---|---|---|---|
| 4,219,152 | 8/1980 | Couch et al. | 235/463 |
| 4,323,772 | 4/1982 | Serge | 235/463 |
| 5,189,292 | 2/1993 | Batterman et al. | 235/494 |
| 5,272,323 | 12/1993 | Martino | 235/462 |
| 5,288,986 | 2/1994 | Pine et al. | 235/494 |
| 5,324,924 | 6/1994 | Cai et al. | 235/463 |
| 5,400,415 | 3/1995 | Kobayashi | 382/51 |
| 5,504,315 | 4/1996 | Hardesty et al. | 235/462 |
| 5,724,364 | 3/1998 | Mori et al. | 371/6 |

FOREIGN PATENT DOCUMENTS

| | | |
|---|---|---|
| 203659 | 3/1986 | European Pat. Off. . |
| 388204 | 9/1990 | European Pat. Off. . |
| 670555 | 4/1994 | European Pat. Off. . |

*Primary Examiner*—Anita Pellman Gross
*Assistant Examiner*—Douglas X. Rodriguez
*Attorney, Agent, or Firm*—Frishauf, Holtz, Goodman, Langer & Chick

[57] ABSTRACT

A threshold determination/binarization circuit and a recording medium for an information reproduction system, wherein the diameter of a reference dot detected by a reference dot diameter detection section is compared with a predetermined dot diameter as a standard value, and the threshold is adjusted such that the difference between the reference dot diameter and the standard value equals a predetermined target value, thereby obtaining the same binarization effect with respect to image signals obtained with different transfer characteristics (different media, recording states, and optical systems). This circuit also includes a maximum/minimum value detection section that detects the maximum and minimum values of an image signal level corresponding to a dot code. A threshold is calculated by using an internal ratio representing the radio between the maximum and minimum values so as to stabilize a reading operation against illumination and recording irregularity, contamination of a dot code, and the like. On a dot code recorded on a recording medium, attribute dots, each containing information associated with the recording medium, are arranged in a predetermined area on the reading start end side to set a threshold for binarization.

50 Claims, 28 Drawing Sheets

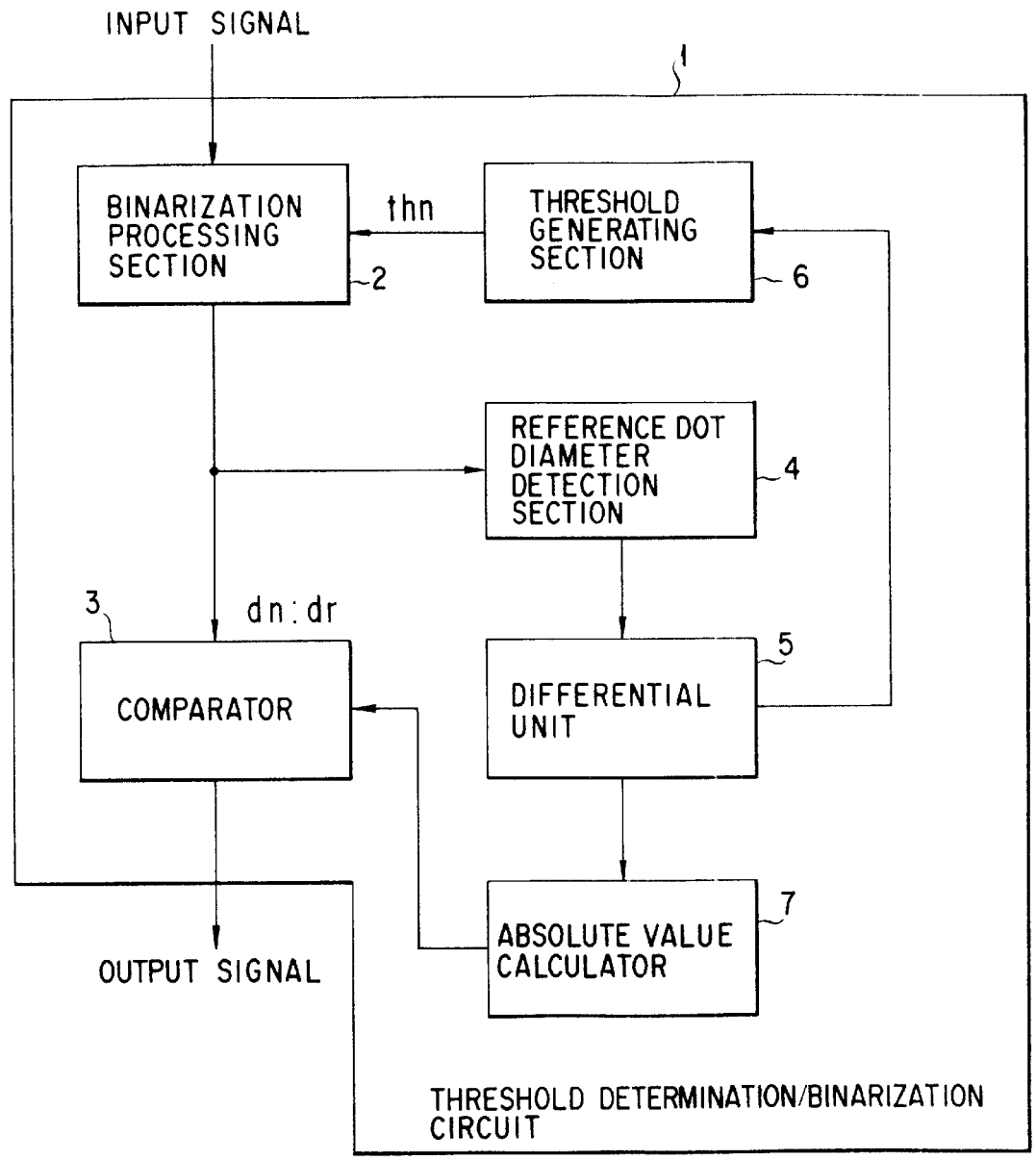
F I G. 1

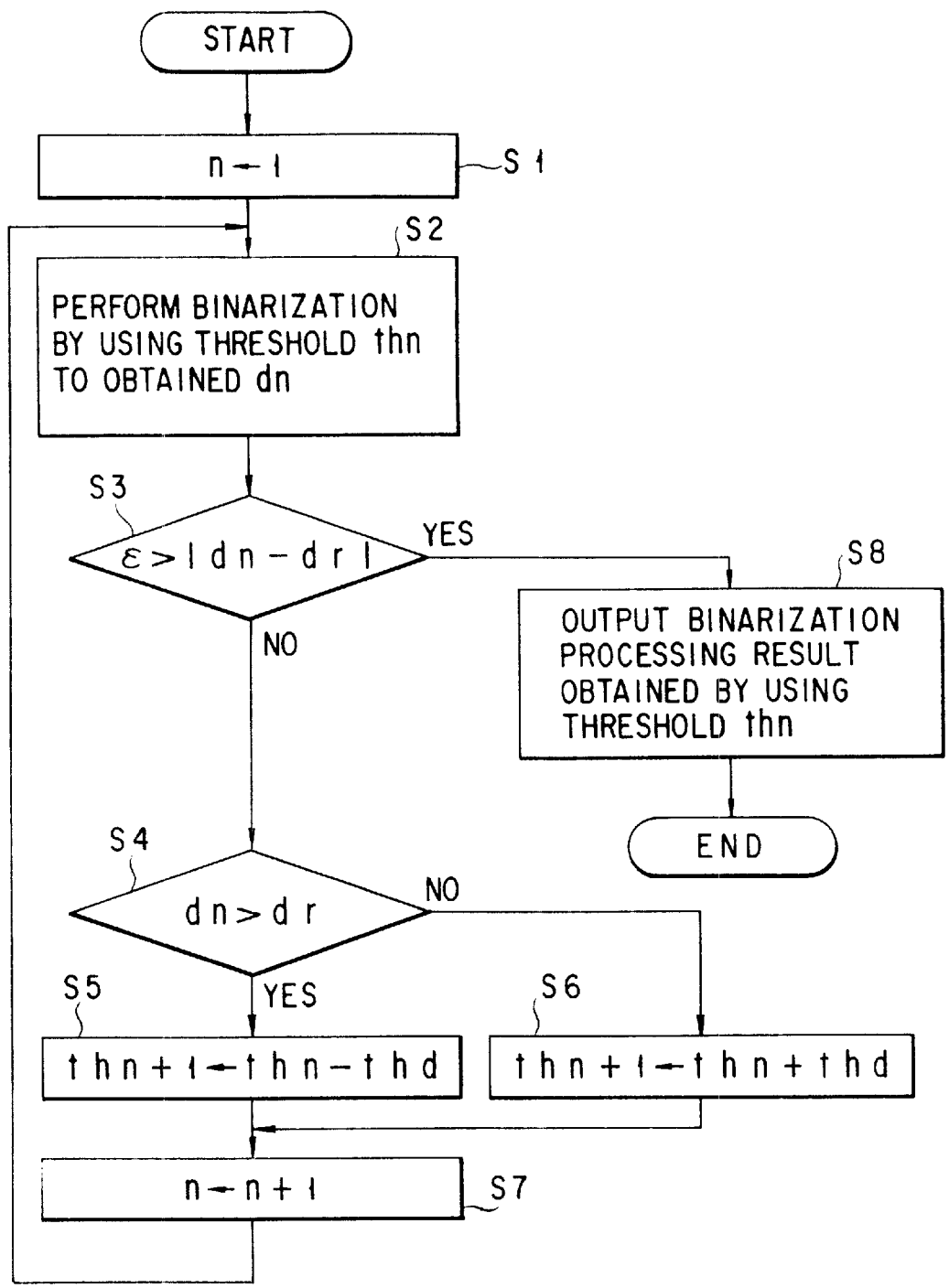
F I G. 2

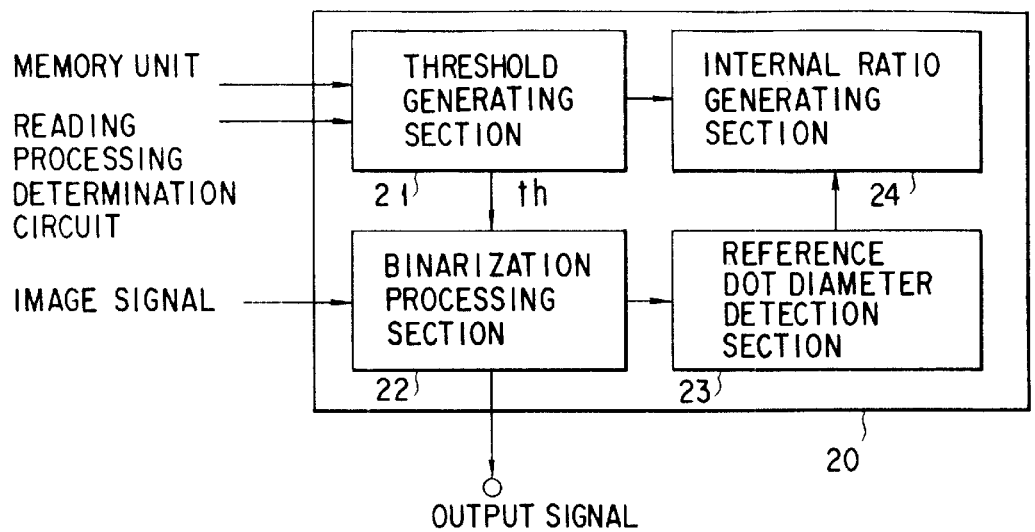
F I G. 10
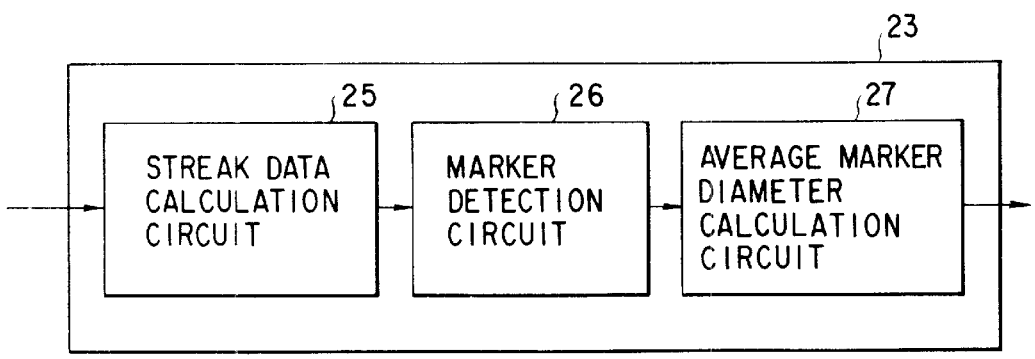
F I G. 11

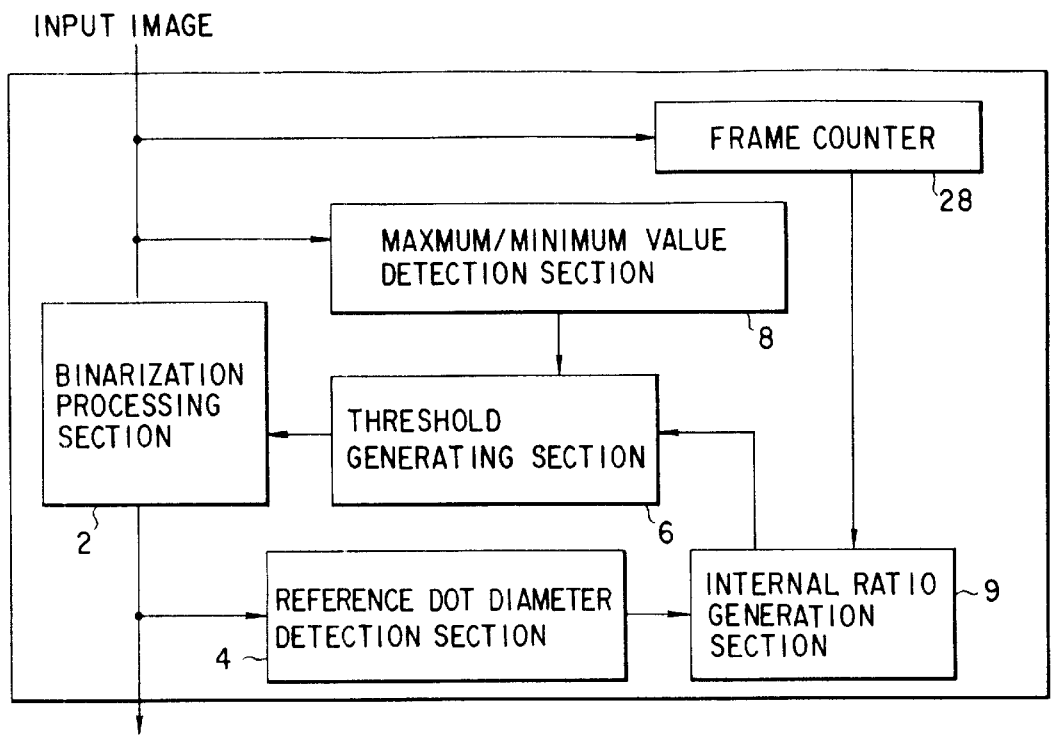
F I G. 13
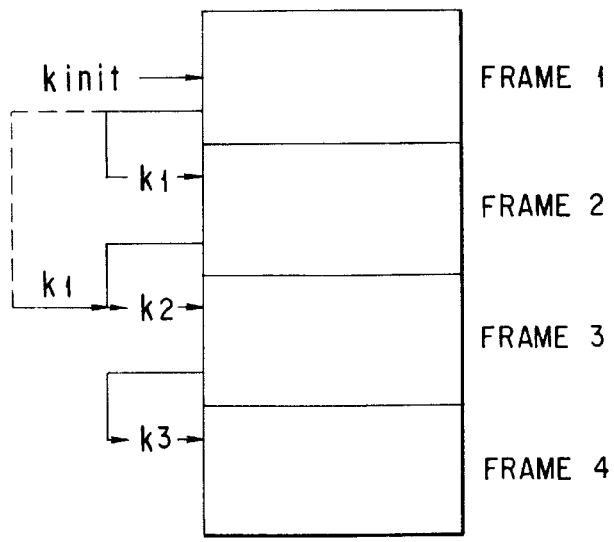
F I G. 14

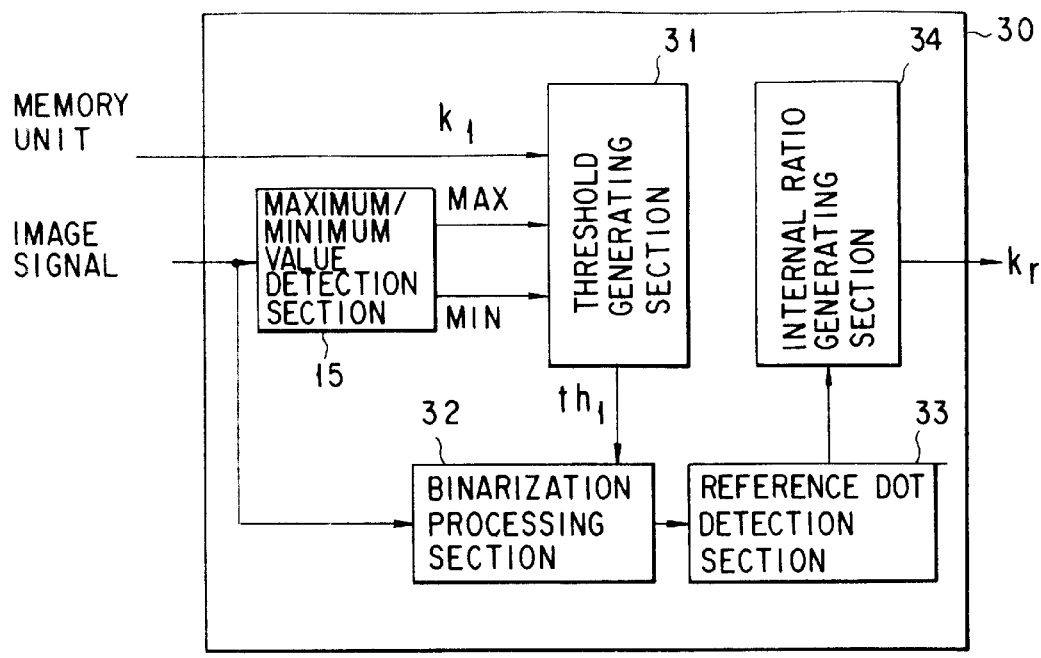
F I G. 18
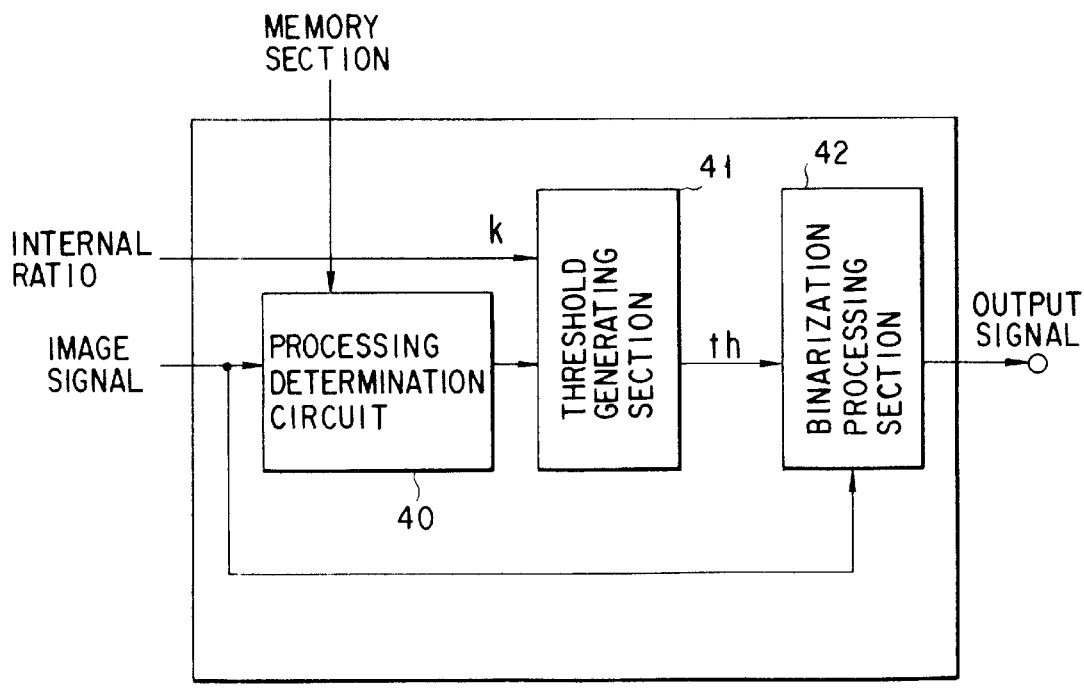
F I G. 24

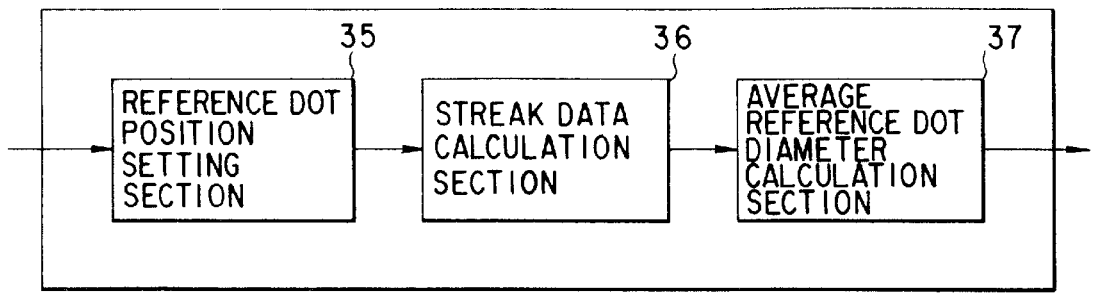
F I G. 19
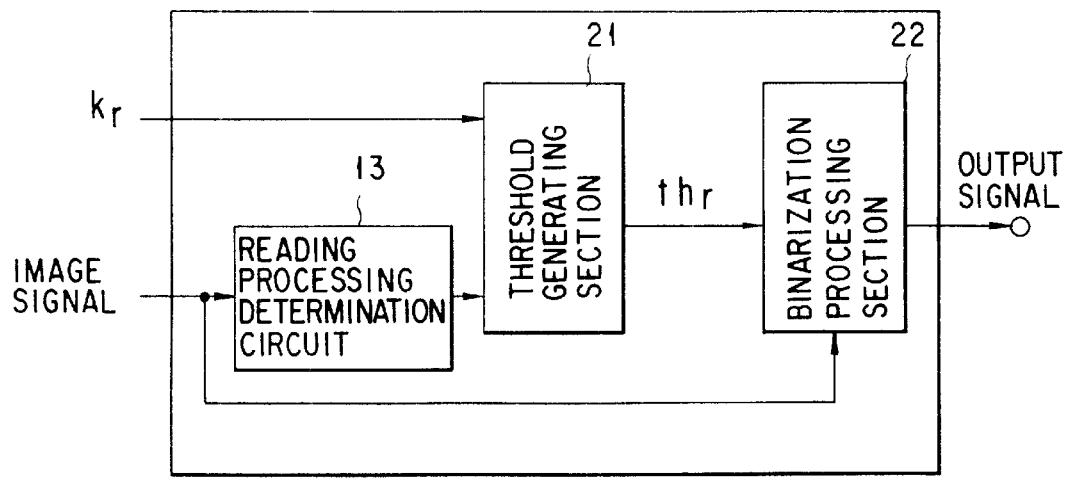
F I G. 20

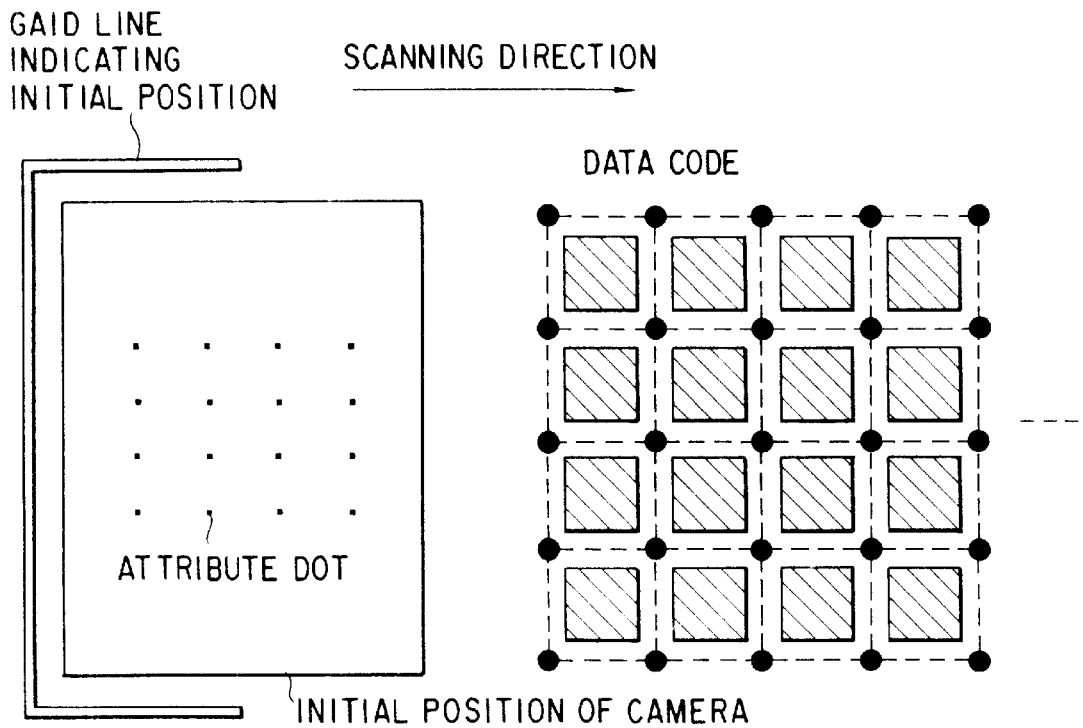
F I G. 22
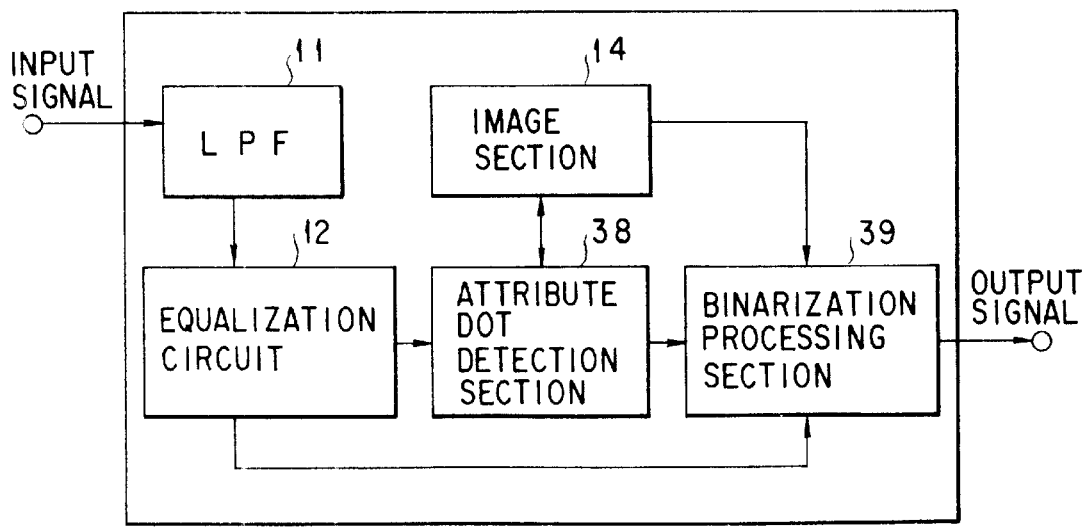
F I G. 23

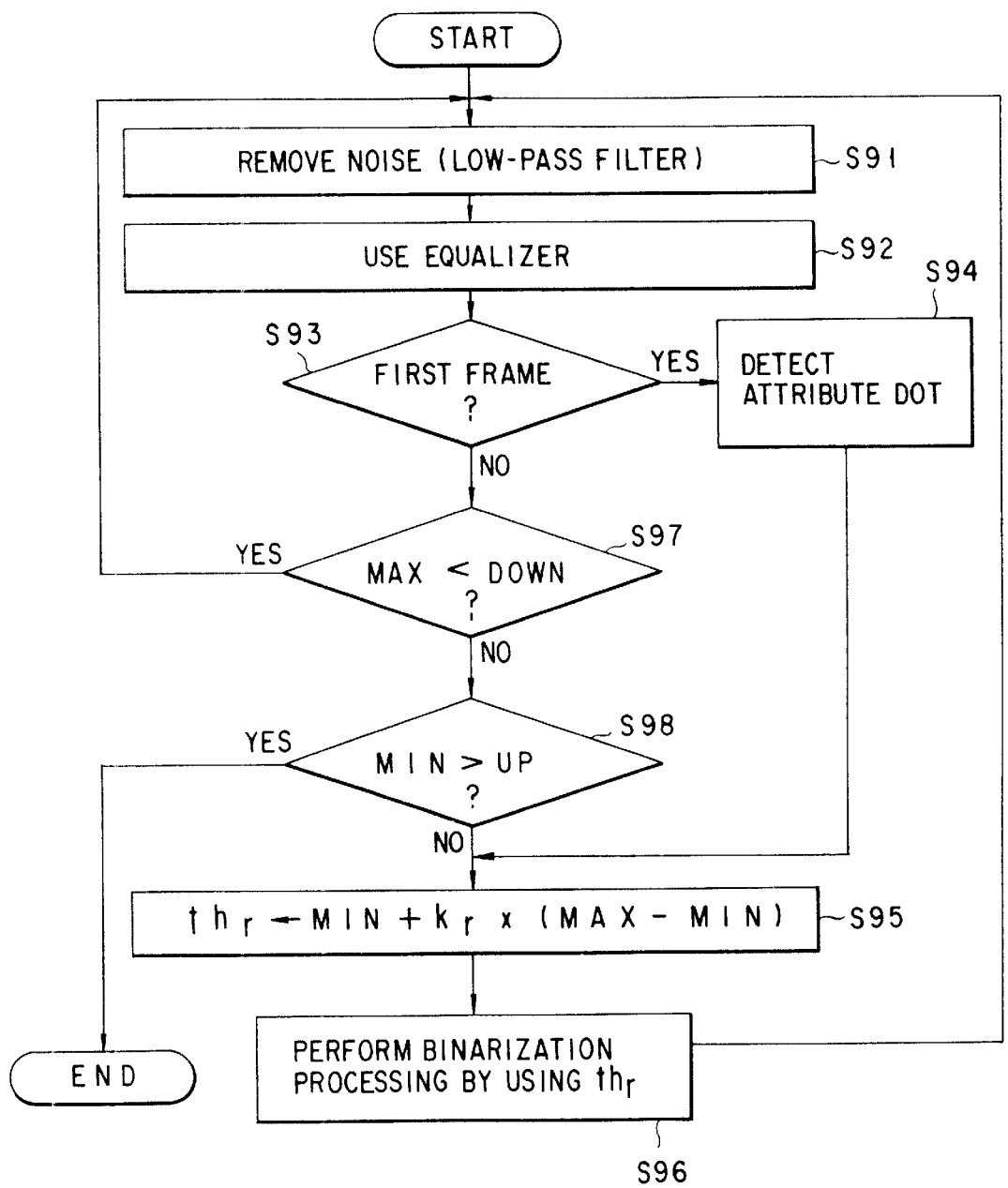
F I G. 25

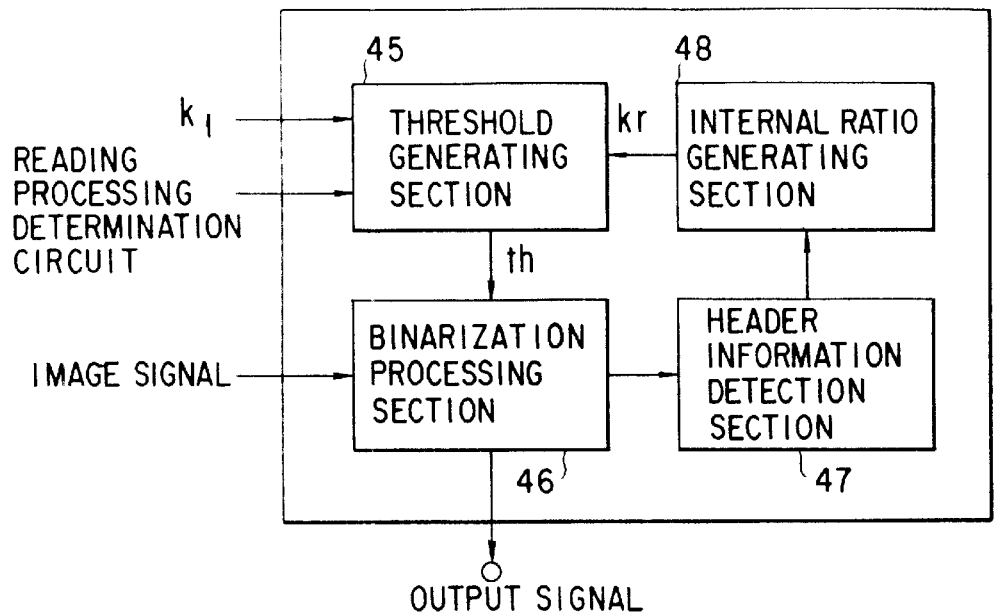
F I G. 28
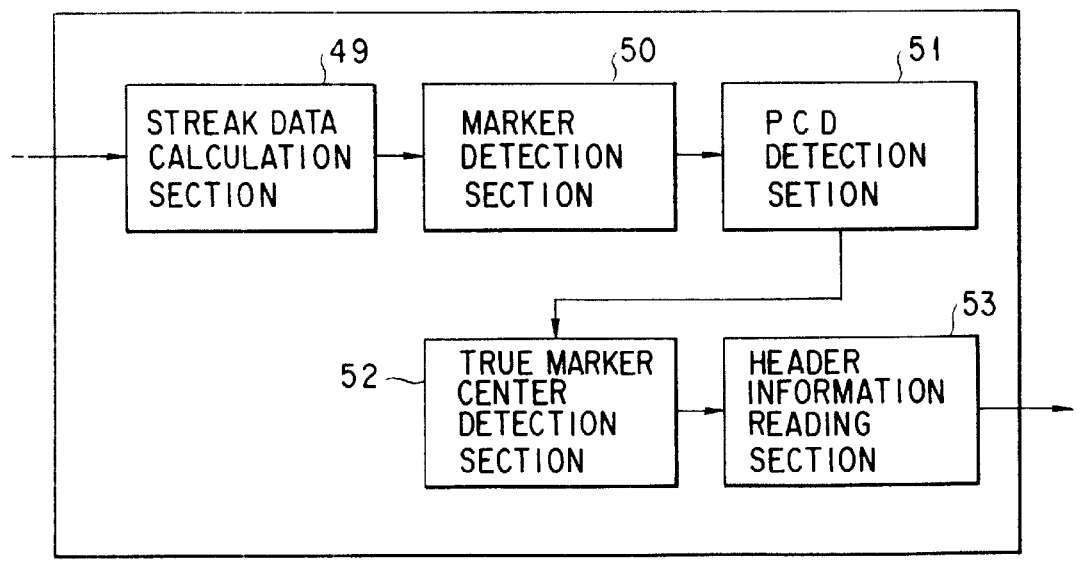
F I G. 29

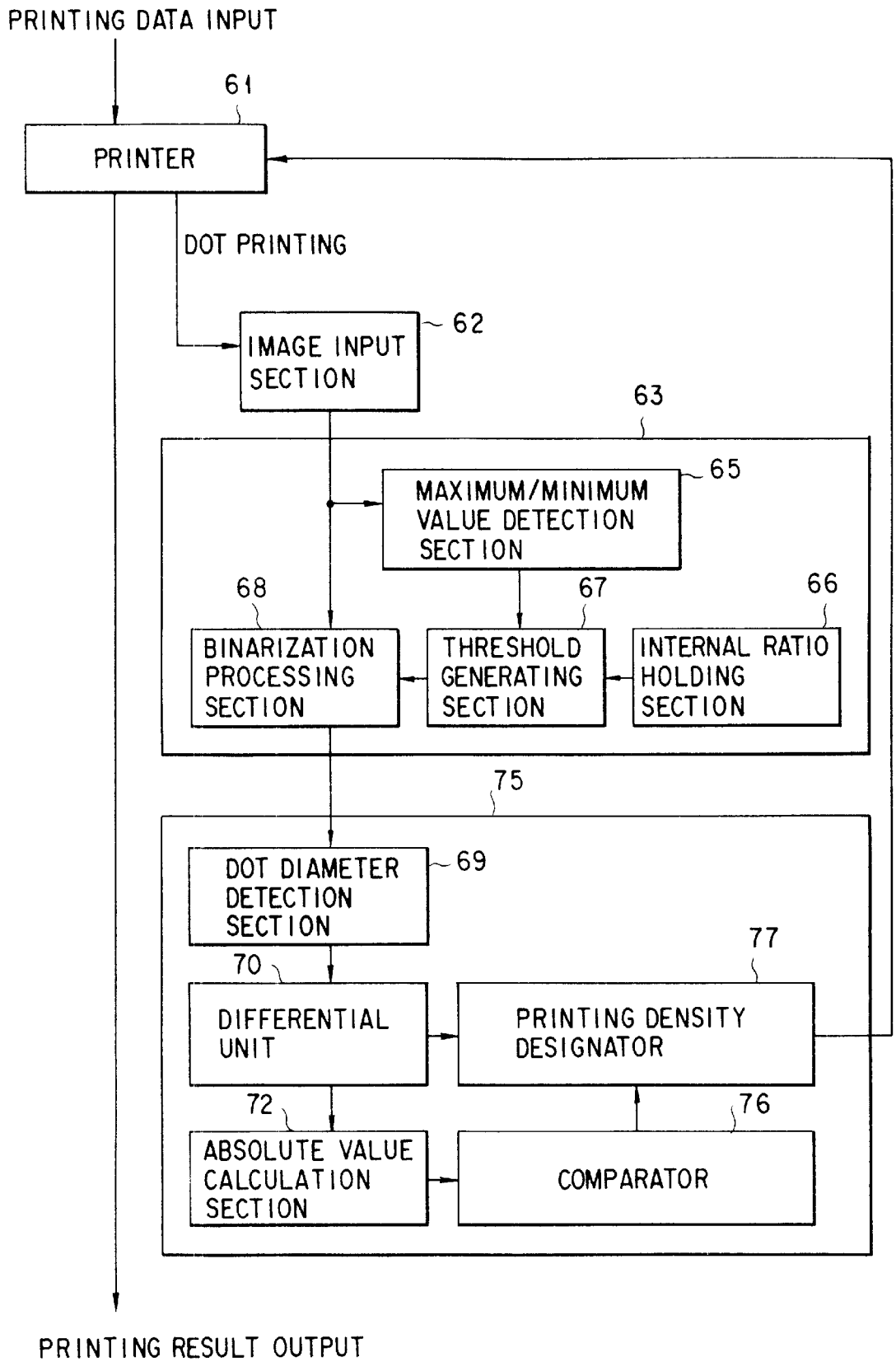
F I G. 35

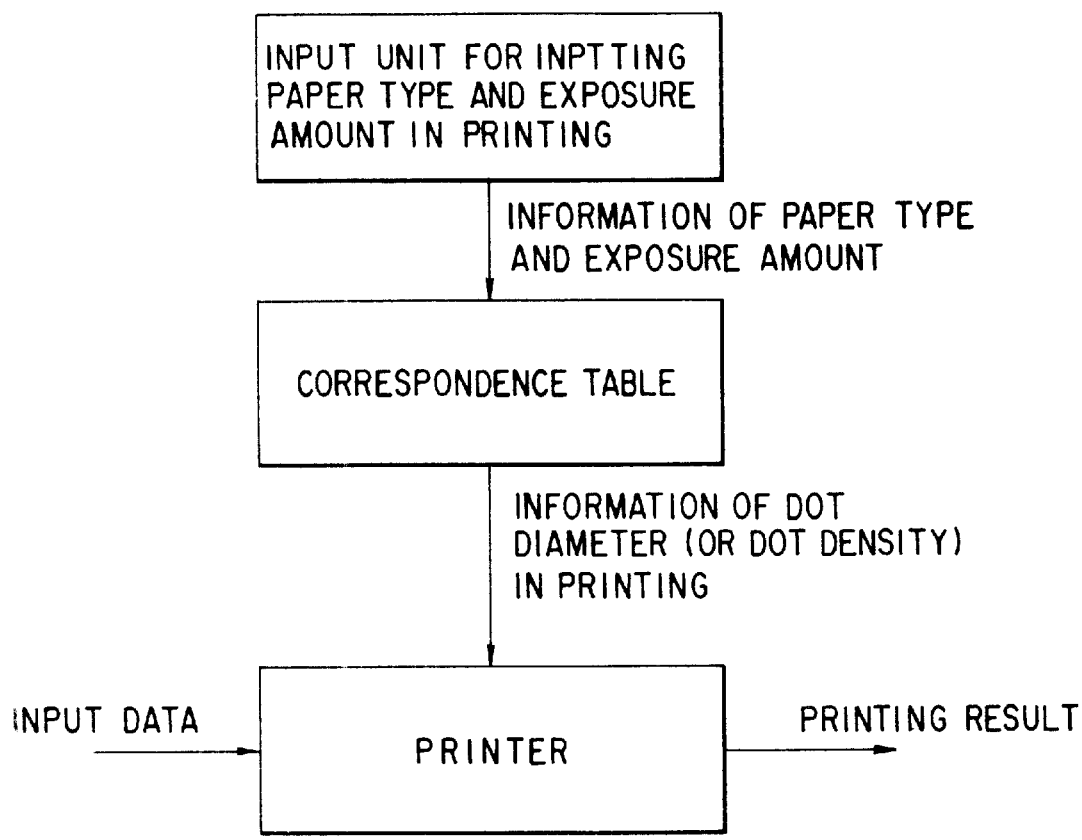
F I G. 37

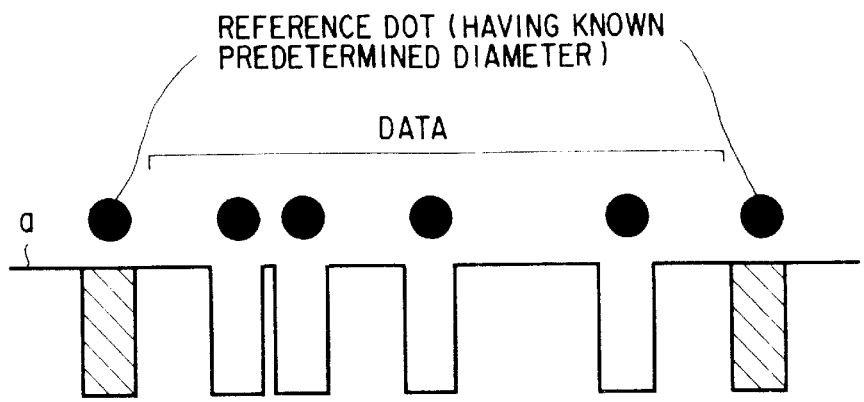

FIG. 39A (PRIOR ART)  ORIGINAL SIGNAL

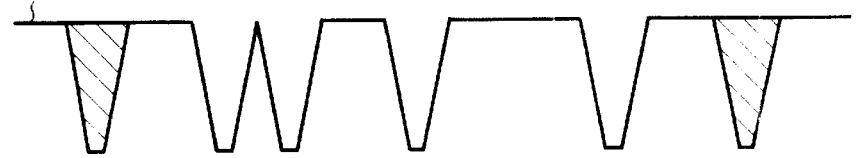

FIG. 39B (PRIOR ART)  DEGRADED SIGNAL 1 (DEGRADED SIGNAL BASED ON TRANSFER CHARACTERISTIC 1)

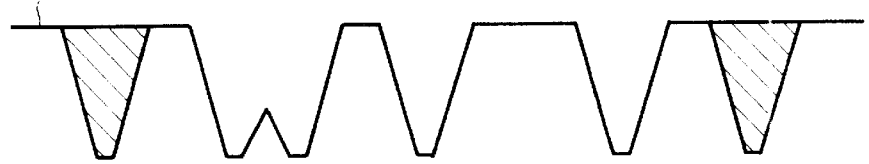

FIG. 39C (PRIOR ART)  DEGRADED SIGNAL 2 (DEGRADED SIGNAL BASED ON TRANSFER CHARACTERISTIC 2)

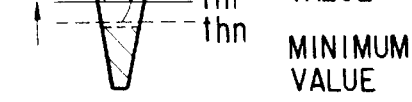

REFERENCE DOT PORTION OF DEGRADED SIGNAL 1

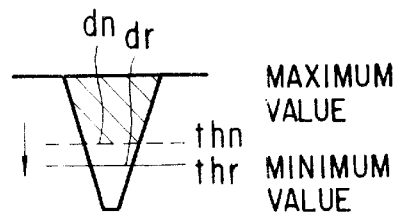

REFERENCE DOT PORTION OF DEGRADED SIGNAL 2

$thn = MIN + kn \times (MAX - MIN)$ k : INTERNAL RATIO FOR DETERMINING THRESHOLD

MAX, MIN : PICKUP OPERATION OR FIXED VALUES (IF LIGHT AMOUNT DOES NOT VARY)

INFORMATION REPRODUCTION SYSTEM, INFORMATION RECORDING SYSTEM AND INFORMATION RECORDING MEDIUM UTILIZING AN OPTICALLY READABLE DOT CODE

BACKGROUND OF THE INVENTION

1. Field of the Invention

The present invention relates to an information reproduction system for optically reading a code pattern from an information recording medium such as paper, on which so-called multimedia information including, e.g., audio information, video information, and digital code data is recorded as an optically readable pattern code, and for reproducing the original multimedia information. More particularly, the present invention relates to a threshold determination/binarization circuit for performing a threshold setting operation for binarization processing in binarizing an image signal representing a read two-dimensional code pattern.

2. Description of the Related Art

As media for recording speech information, music information, and the like, a magnetic tape, an optical disk, and the like are generally known. However, even if copies of these media are produced in large quantities, the unit cost of production is relatively high, and storage of such copies requires a large space.

In addition, when a medium on which speech information is recorded needs to be handed to a person in a remote place, it takes much labor and time to mail or directly take the medium to the person.

So-called multimedia information other than audio information, including video information obtained by a camera, video equipment or the like, and digital code data obtained from a personal computer, wordprocessor, or the like have the same problems.

As means for solving such problems, PCT Appln. Publication WO 94/08314 (corresponding to U.S. Pat. Application 08/407,018) discloses a system which can fax multimedia information including at least one of audio information, video information, and digital code data, produce copies of such information in large quantities at a low cost, and record image information, i.e., code information, on an information recording medium such as paper, in the form of a two-dimensional code pattern having a plurality of dots two-dimensionally arranged, and a system for reproducing such information.

A dot code as a two-dimensional code pattern is described in this publication. According to the data format of this dot code, one block consists of a marker, a block address, address error detection and error correction data, and a data area in which actual data is written. Such blocks are two-dimensionally arranged in the vertical and horizontal directions. A dot code is made of a collection of these blocks.

FIG. 38 shows the arrangement of a multimedia information reproduction apparatus disclosed in the above publication.

This information reproduction apparatus comprises a detection section 184 for reading a dot code from a sheet 182 on which a dot code 170 is printed, a scan conversion section 186 for recognizing image data supplied from the detection section 184 as a dot code and normalizing it, a binarization processing section 188 for converting multivalue data into binary data, a demodulating section 190, an adjusting section 192 for adjusting a data string, a data error correction section 194 for correcting a read error in a reproducing operation and a data error, a data separation section 196 for separating data in accordance with their attributes, expansion processing sections for performing expansion processes for data compression processes in accordance with the attributes of data, and a display or reproduction unit, and other input devices.

In the detection section 184, the dot code 170 on the sheet 182 is illuminated with a light source 198, and reflected light is incident on an image pickup portion 204 such as a CCD or a CMD via an imaging optical system 200 such as a lens and a spatial filter 202 for removing moire and the like. The image pickup portion 204 converts the information of the incident light into an electrical signal as an image signal. The image signal is then amplified by a preamplifier 206 to be output.

The light source 198, the imaging optical system 200, the spatial filter 202, the image pickup portion 204, and the preamplifier 206 are arranged in an external light shielding section 208 for preventing disturbance caused by external light. The image signal amplified by the preamplifier 206 is converted into digital information by an A/D conversion section 210 and supplied to the scan conversion section 186 on the next stage.

Note that the image pickup portion 204 is controlled by an image pickup portion control section 212. Assume that a CCD of an interline transfer scheme is to be used as the image pickup portion 204. In this case, the image pickup portion control section 212 outputs the following control signals to the image pickup portion 204: a vertical blanking signal for vertical synchronization; an image pickup element reset pulse signal for resetting information charges; a charge transfer gate pulse signal for transferring charges stored in a two-dimensionally arrayed charge transfer/storage section to a plurality of vertical shift registers; a horizontal charge transfer CLK signal as a transfer clock signal for a horizontal shift register for transferring charges in the horizontal direction and externally outputting them; a vertical charge transfer pulse signal for transferring the charges from the vertical shift registers in the vertical direction and supplying them to the horizontal shift register, and the like.

The image pickup portion control section 212 supplies an emission cell control pulse to the light source 198 to adjust the emission timing of the light source 198 in accordance with the read timing of the image pickup portion 204.

Image data is read out in the time interval of one field between one blanking timing and another. Instead of continuously lighting the light source 198, a periodic flickering operation (pulse lighting operation) is performed, and subsequent flickering operations are performed while synchronization is established in units of fields. In this case, the exposure timing is controlled to perform exposure during the vertical blanking period, i.e., a period during which no image charges are output, in order to prevent clock noise caused by the above flickering operation from mixing with the signal output. That is, an emission cell control pulse, which is a very fine digital clock pulse which is generated instantaneously, serves to supply large power to the light source. For this reason, some measure must be taken to prevent noise from mixing with the analog image signal. For this reason, pulse lighting of the light source is performed during the vertical blanking period. With this operation, the S/N ratio can be increased. In addition, flickering at predetermined intervals (pulse lighting) shortens the emission time. Therefore, the influences of a shake caused by a manual operation and blurring caused by movement of the apparatus can be eliminated. This allows a high-speed scanning operation.

In addition, assume that the reproduction apparatus tilts, and disturbance such as external light enters in spite of the external light shielding section 208. Even in this case, in order to minimize a decrease in S/N ratio, an image pickup element reset pulse is output to reset an image signal once before the light source 198 is caused to emit light during a vertical blanking period, and emission of light is performed immediately after resetting of this image signal. A data read operation is performed immediately after this operation.

The scan conversion section 186 will be described next. The scan conversion section 186 is a section for recognizing image data supplied from the detection section 184 as a dot code, and normalizing it. As a technique for this operation, the image data from the detection section 184 is stored in an image memory 214, read out therefrom temporarily, and supplied to a marker detection section 216. The marker detection section 216 detects a marker of each block.

A data array direction detection section 218 detects any rotation or inclination and the array direction of the data by using the markers. An address control section 220 reads out image data from the image memory 214 and supplies the data to an interpolation circuit 222 so as to correct it in accordance with the detection result. At this time, lens aberration information is read out from a memory 224 for correcting the distortion of the aberration of the lens of the imaging optical system 200 of the detection section 184, thereby performing lens correction as well. The interpolation circuit 222 performs interpolation processing of the image data to convert it into an original pattern, i.e., a dot code.

An output from the interpolation circuit 222 is supplied to the binarization processing section 188. The dot code 170 is basically a black and white pattern, i.e., binary information. Therefore, the data is converted into binary data by the binarization processing section 188.

At this time, binarization is adaptively performed while threshold determination is performed by a threshold determination circuit 226 in consideration of the influences of disturbance, signal amplitude, and the like.

Since modulation has been performed in the recording operation, the demodulating section 190 demodulates the data, and inputs the resultant data to the data string adjusting section 192.

In the data string adjusting section 192, the block addresses of the above two-dimensional blocks are detected by a block address detection section 228 first, and error detection and correction of the block addresses are then performed by a block address error detection/correction section 230. Thereafter, an address control section 232 stores the resultant data in a data memory section 234 in units of blocks. By storing the data in units of block addresses in this manner, the data can be efficiently stored even if an intermediate data portion is omitted or data starts from an intermediate data portion.

After this operation, error correction of the data read out from the data memory section 234 is performed by the data error correction section 194. An output from the data error correction section 194 is branched to two ways. One output is supplied, as digital data, to a personal computer, a wordprocessor, an electronic notebook, or the like via an I/F 236. The other output is supplied to the data separation section 196 to be separated into image data, handwritten character or graph data, character or line drawing data, and sound data (including two types, i.e., sound data without any processing and data having undergone speech synthesis).

Image data corresponds to natural image data, which is multivalue image data. An expansion processing section 238 performs expansion processing of this data, which corresponds to JPEG in data compression. In a data interpolation circuit 240, data for which error correction cannot be performed is interpolated.

For binary image information relating to a handwritten character or a graph, an expansion processing section 242 performs expansion processing corresponding to MR/MH/MMR or the like in data compression. In a data interpolation circuit 244, data for which error correction cannot be performed is interpolated.

Character or line drawing data is converted into a different pattern for display by a PDL (Page-Description Language) processing section 246. Note that even line drawing or character information which has been coded and undergone compression processing for a code is subjected to corresponding expansion (Huffman coding, Ziv-Lempel, or the like) processing in an expansion processing section 248, and is supplied to the PDL processing section 246.

Outputs from the data interpolation circuits 240 and 244 and the PDL processing section 246 are synthesized or selected by a synthesizing/switching circuit 250. The resultant data is converted into an analog signal by a D/A conversion section 252. Thereafter, the corresponding information is displayed on a display unit 254 such as a CRT (TV monitor) or an FMD (face-mounted display). Note that the FMD is a glass-type monitor (handy monitor) to be mounted on the face of the user, and can be effectively used for, e.g., a virtual reality operation or looking at an image on a large frame in a narrow place.

Speech information is subjected to expansion processing in an expansion processing section 256, which corresponds to ADPCM. Furthermore, in a data interpolation circuit 258, data for which error correction cannot be performed is interpolated. In performing speech synthesis, a speech synthesis section 260 receives a code for speech synthesis, actually synthesizes speech from the code, and outputs it. In this case, if the code itself is compressed, speech synthesis is performed after expansion processing such as Huffman coding or Ziv-Lempel processing is performed in an expansion processing section 262, as in the case of the above character or line drawing information. Outputs from the data interpolation circuit 258 and the speech synthesis section 260 are synthesized or selected by a synthesizing/switching circuit 264. The resultant data is then converted into an analog signal by a D/A conversion section 266. The signal is output to a loudspeaker, a headphone or a speech output unit 268 equivalent thereto.

Character or line drawing information is directly output from the data separation section 196 to a page printer or plotter 270. As a result, the character information can be printed, as wordprocessor characters, on a paper sheet, or the line drawing information can be output, as a drawing, from a plotter. As is apparent, image information can also be printed by a video printer as well as being displayed on a CRT or an FMD, or the image can be photographed.

In this information reproduction apparatus, for example, the detection section 184 and the scan conversion section 186 are stored in a pen type housing to constitute a reading section for optically reading the dot code 170. The user traces the dot code 170 with this reading section in his/her hand.

In the above information reproduction system, an output from the interpolation circuit 222 is binarized by the binarization processing section 188. At this time, binarization is adaptively performed while threshold determination is performed by the threshold determination circuit 226 in consideration of the influences of disturbance, signal amplitude, and the like.

When a threshold is determined by the threshold determination circuit 226, the actually read maximum and minimum values vary. That is, the density of an ink and the diameter of a dot vary because of illumination irregularity in reproduction processing, variations in quality of printing paper, and exposure amount errors in printing processing if printing paper is exposure paper. For this reason, as shown in FIGS. 39A to 39E, an original rectangular signal a representing a reference dot, which is should be obtained, is degraded to become a degraded signal b or c having a signal width different from that of the original signal.

When, therefore, the original signal is detected as the degraded signal b, a signal width dn based on the read value becomes smaller than a predetermined standard signal width dr, as shown in FIG. 39D. If the original signal is detected as the degraded signal c, a signal width dn based on the read value becomes larger than a predetermined standard signal width dr, as shown in FIG. 39E. In reality, a threshold for an optimal signal width is not obtained.

As described above, while a threshold for providing a standard signal width has an error, read data is binarized in the subsequent processing.

Jpn. Pat. Appln. KOKAI Publication No. 57-132278 discloses a technique of determining slice levels in units of black bars, as a binarization processing means, in bar codes, and performing arithmetic processing of identical black bars by using the previous slice level up to a predetermined space width. That is, a threshold for binarization is determined with reference to a space area (white area).

In determining a threshold for binarization in the technique disclosed in Jpn. Pat. Appln. KOKAI Publication No. 57-132278, if noise is caused by dust in a space area between bar codes, the presence of the dust can be eliminated by decreasing the threshold. However, the widths of the subsequent bar codes decrease, so that the standard space area width cannot be maintained.

Furthermore, a threshold cannot be set at once. Rather, set values for the space areas between bar codes sequentially approach a standard value (optimal value) in a trial-and-error manner. Thus, it takes much time to reach the standard value, and a high-precision threshold cannot be obtained.

According to the binarization threshold determination technique disclosed in Jpn. Pat. Appln. KOKAI Publication No. 63-171477, a predetermined pulse width is compared with the pulse width of an output signal, and one of a plurality of predetermined pulse widths which is nearest to the pulse width of the output signal is selected. Therefore, a threshold does not coincide with an optimal value unless a predetermined pulse width accidentally coincides with the pulse width of an output signal. That is, a threshold having an error is inevitably set. In order to select an optimal value, a plurality of comparison results must be simultaneously output, resulting in a large circuit scale.

SUMMARY OF THE INVENTION

It is, therefore, an object of the present invention to provide a threshold determination/binarization circuit which generates a proper threshold to binarize an information code pattern without being influenced by changes in ink density and dot diameter caused by illumination irregularity in reproduction processing, variations in quality of printing paper, and exposure amount errors in printing processing.

According to the present invention, there is provided a threshold determination/binarization circuit in an information reproduction system for reading a desired dot code from a recording medium on which multimedia information including at least one of audio information, image information, and digital code data is recorded as an optically readable dot code, for generating binary data from an image signal corresponding to the dot code, and for restoring the binary data to the original multimedia information. The recording medium has a reference dot having a known size which is to be used as a standard dot to set a threshold for generating the binary data, and a threshold setting means is provided for, before binary data is generated from the image signal, detecting the reference dot, comparing a size of the detected reference dot with the known size of the reference dot, and re-setting the threshold such that a difference between the sizes becomes equal to a predetermined target value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing an arrangement of a threshold determination/binarization circuit in an information reproduction system according to the first embodiment of the present invention;

FIG. 2 is a flow chart for explaining the operation of the threshold determination/binarization circuit of the first embodiment;

FIG. 10 is a block diagram showing a detailed arrangement of a binarization processing circuit in FIG. 8;

FIG. 11 is a block diagram showing a detailed arrangement of a reference dot detection section in FIG. 10;

FIG. 13 is a block diagram showing the arrangement of a threshold determination/binarization circuit as the fifth embodiment of the present invention;

FIG. 14 is a view for explaining the principle of the fifth embodiment;

FIG. 18 is a block diagram showing an arrangement of an adaptive threshold detection section in FIG. 17;

FIG. 19 is a block diagram showing an arrangement of a reference dot detection section in FIG. 18;

FIG. 20 is a block diagram showing an arrangement of a binarization processing circuit in FIG. 17;

FIG. 22 is a view showing an arrangement (format) of attribute dots on a recording sheet used in the seventh embodiment of the present invention;

FIG. 23 is a block diagram showing the arrangement of a threshold determination/binarization circuit as the seventh embodiment;

FIG. 24 is a block diagram showing an arrangement of a binarization processing section in FIG. 23;

FIG. 25 is a flow chart for explaining the operation of a threshold determination/binarization circuit of the seventh embodiment;

FIG. 28 is a block diagram showing a detailed arrangement of a binarization processing circuit in FIG. 27;

FIG. 29 is a block diagram showing an arrangement of a header information detection section in FIG. 28;

FIG. 35 is a block diagram showing the arrangement of an output unit for adjusting the dot density in a printing operation;

FIG. 37 is a block diagram showing an arrangement of the 11th embodiment of the present invention;

FIGS. 39A to 39E are views showing the relationship between the waveform of an original signal representing a reference dot, the waveforms of degraded signals, detected thresholds, and a standard threshold.

DETAILED DESCRIPTION OF THE PREFERRED EMBODIMENTS

Embodiments of the present invention will be described in detail below with reference to the accompanying drawings.

Figure 38:
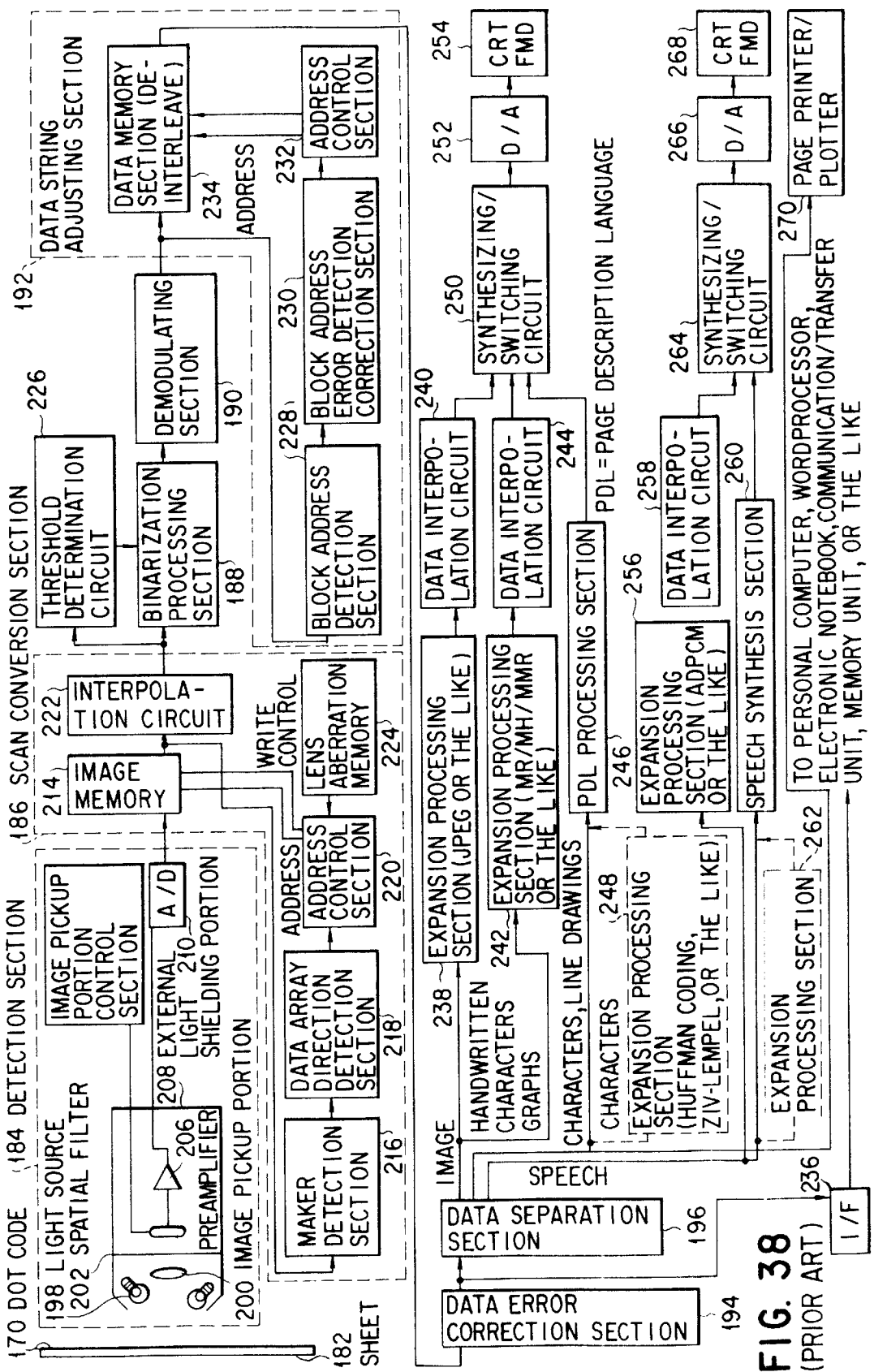
FIG. 38 is a block diagram showing the arrangement of a conventional multimedia information reproduction apparatus.

FIG. 1 shows an example of the arrangement of a threshold determination/binarization circuit for performing binarization in reproducing multimedia information in an information reproduction system according to the first embodiment of the present invention. FIG. 1 shows only the characteristic portions of the information reproduction system of the present invention, which correspond to the binarization processing section 188 and the threshold determination circuit 226 in the information reproduction system in FIG. 38. This information reproduction system is the same as that shown in FIG. 38 except for these portions, and hence a description thereof will be omitted.

A threshold determination/binarization circuit 1 comprises a binarization processing section 2 for binarizing a dot code from an interpolation circuit on the preceding stage, a reference dot diameter detection section 4 for detecting a reference dot diameter dn, a differential unit 5 for calculating the difference between the reference dot diameter dn and a standard dot diameter dr, a threshold generating section 6 for generating a threshold thn on the basis of the difference from the differential unit 5, an absolute value calculator 7 for calculating the absolute value of the difference from the differential unit 5, and a comparator 3 for comparing the absolute value with a predetermined value $\epsilon$, and outputting a binary signal obtained by using the optimal threshold thn if the absolute value is smaller than the predetermined value $\epsilon$.

The operation of the threshold determination/binarization circuit 1 having this arrangement will be described with reference to the flow chart of FIG. 2.

First of all, a variable (the number of times of processing) n is set to 1 (step S1). Binarization is performed with the predetermined threshold thn only in the first operation, but is performed with the previously determined threshold thn in the second and subsequent operations to obtain the reference dot diameter dn (step S2).

The absolute value of the difference between the standard dot diameter dr and the reference dot diameter dn is calculated and compared with the predetermined value $\epsilon$ (step S3). If it is determined that the absolute value of the difference is larger than the predetermined value $\epsilon$ (NO), the difference is regarded as a sufficiently large value, and the standard dot diameter dr is compared with the reference dot diameter dn (step S4 ). If it is determined that the reference dot diameter dn is larger (YES), a standard threshold thd is subtracted from the previous threshold thn (step S5) to set a new threshold, and the variable n is incremented (step S7). The flow then returns to step S2 to repeat the same processing. If it is determined that the standard dot diameter dr is larger (NO), the previous threshold thn is added to the standard threshold thd (step S6), and the variable n is incremented. The flow returns to step S2.

If it is determined in step S3 that the absolute value is smaller than the predetermined value ε (YES), the threshold thn is regarded as an optimal value, and the binarization processing result obtained by using the threshold thn is output (step S8). In this manner, thresholds are repeatedly generated by feedback processing so as to eliminate any difference between a signal width dn obtained by the threshold thn and a standard signal width dr, thereby realizing an optimal threshold. With this processing, the threshold converges to a proper threshold by using several reference dots before a data reading operation.

Figure 3:
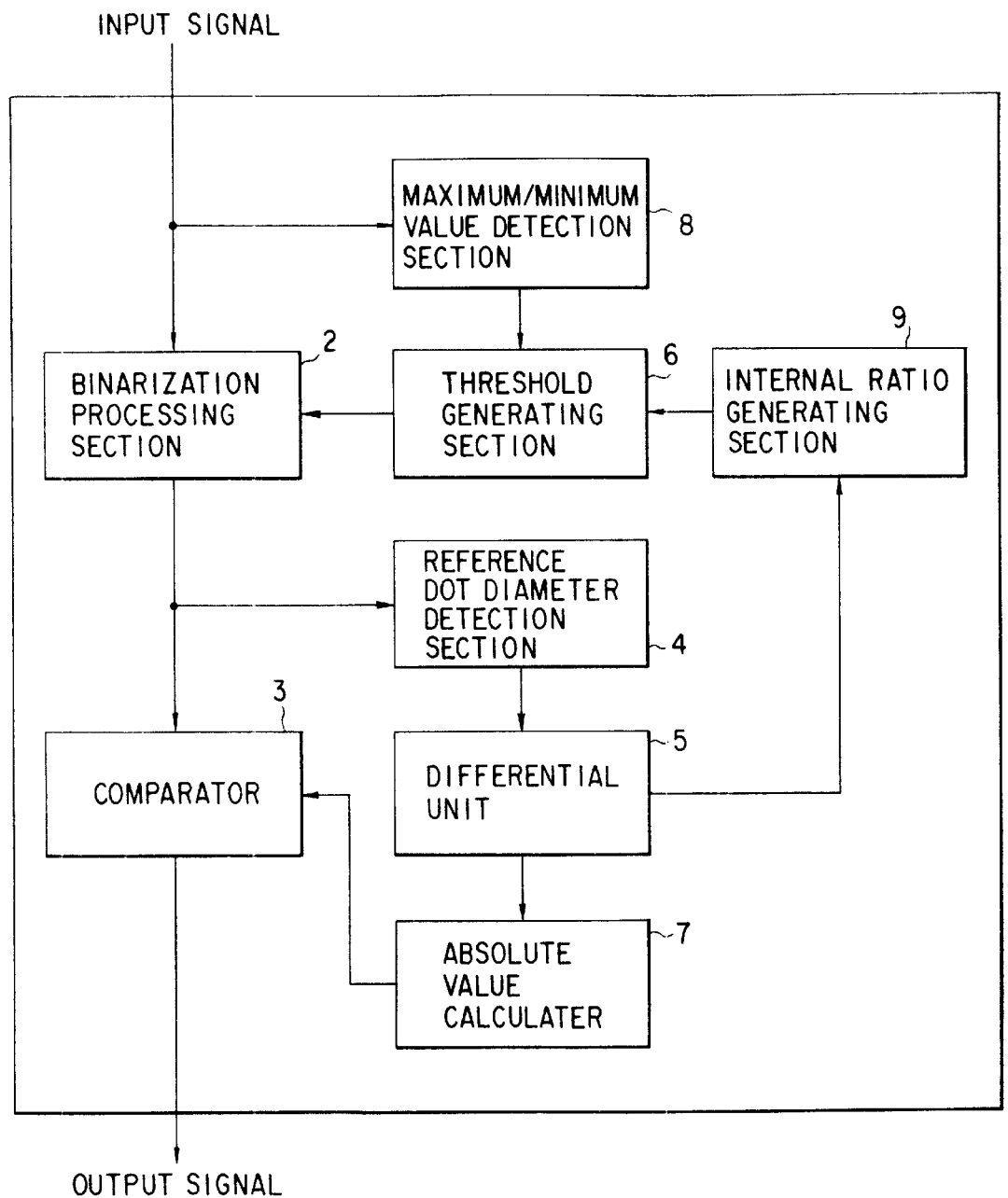
FIG. 3 is a block diagram showing the arrangement of a threshold determination/binarization circuit as the second embodiment of the present invention.

FIG. 3 shows the arrangement of a threshold determination/binarization circuit as the second embodiment of the present invention. The same reference numerals in the second and subsequent embodiments denote the same part as in the first embodiment, and a detailed description thereof will be omitted.

A threshold determination/binarization circuit 1 comprises a binarization processing section 2 for binarizing a dot code from an interpolation circuit on the preceding stage, a maximum/minimum value detection section 8 for detecting the maximum and minimum values of the dot code (reference dot), a reference dot diameter detection section 4 for detecting a reference dot diameter dn, a differential unit 5 for calculating the difference between the reference dot diameter dn and a standard dot diameter dr, an internal ratio generating section 9 for generating an internal ratio on the basis of the difference from the differential unit 5, a threshold generating section 6 for generating a threshold thn on the basis of the generated internal ratio and the maximum and minimum values, an absolute value calculator 7 for calculating the absolute value of the difference from the differential unit 5, and a comparator 3 for comparing the absolute value with a predetermined value ε, and outputting a binary signal obtained by using the optimal threshold thn if the absolute value is smaller than the predetermined value ε.

Figure 4:
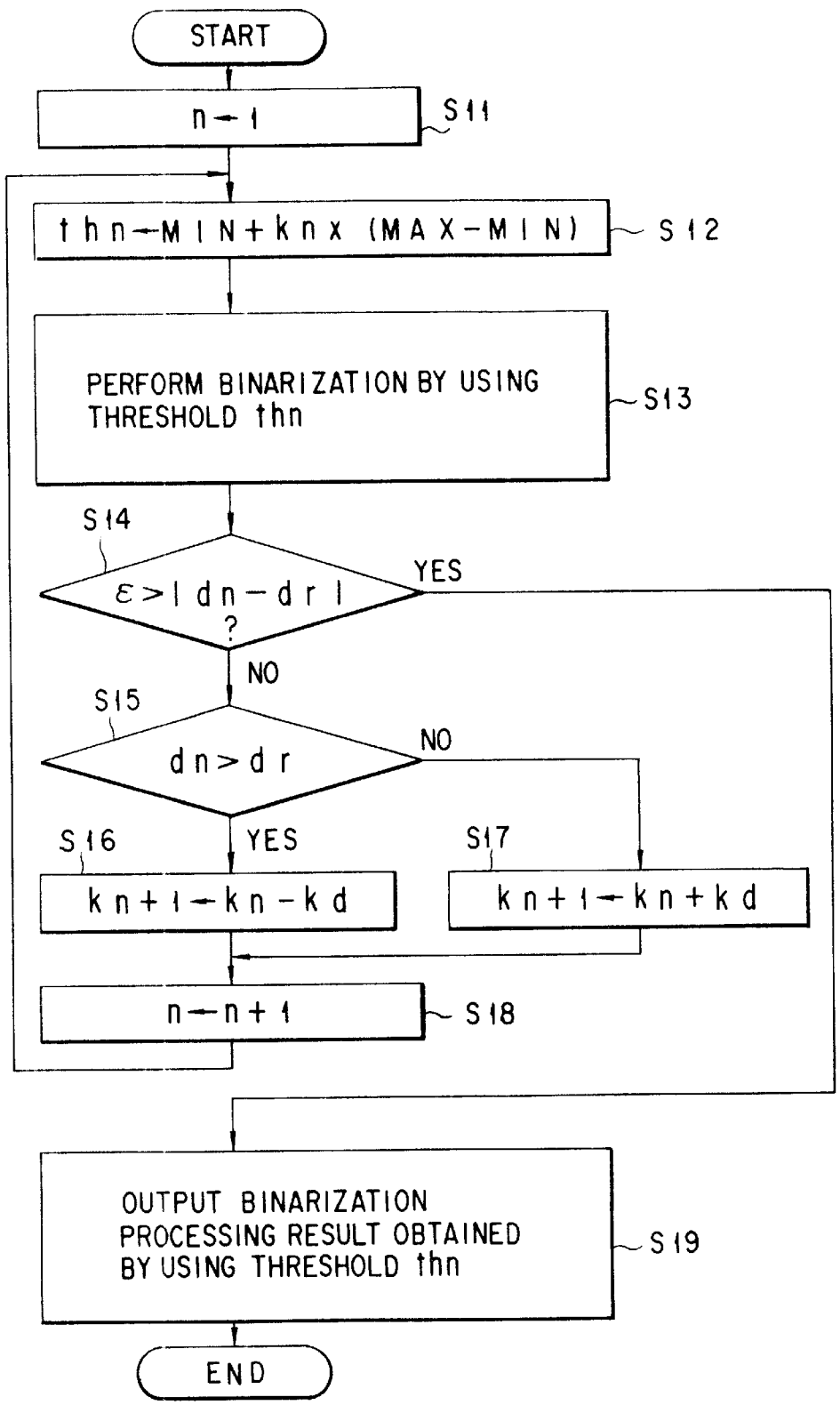
FIG. 4 is a flow chart for explaining the operation of the threshold determination/binarization circuit of the second embodiment.

The operation of the threshold determination/binarization circuit 1 having this arrangement will be described with reference to the flow chart of FIG. 4.

First of all, a variable (the number of times of processing) n is set to 1 (step S11). The threshold thn is generated by using a predetermined internal ratio kn only in the first operation, but is generated by using a previously obtained internal ratio kn+1 as the internal ratio kn in the following operations, according to the following expression (step S12):

$$thn \leftarrow MIN + kn \times (MAX - MIN) \quad (1)$$

Binarization is then performed with the obtained threshold thn to obtain the reference dot diameter dn (step S13).

The absolute value of the difference between the standard dot diameter dr and the reference dot diameter dn is calculated and compared with the predetermined value ε (step S14). If it is determined upon this comparison that the absolute value is smaller than the predetermined value ε (YES), the threshold thn is regarded as an optimal value, and the binarization processing result obtained with the threshold thn is output (step S19).

If the absolute value is larger than the predetermined value ε (NO), the difference is regarded as a sufficiently large value, the standard dot diameter dr is compared with the reference dot diameter dn (step S15). If it is determined that the reference dot diameter dn (YES), a standard internal ratio kd is subtracted from the previous internal ratio kn (step S16) to set a new internal ratio, and the variable n is incremented (step S18). The flow then returns to step S12 to repeat the same processing. If it is determined that the standard dot diameter dr is larger (NO), the previous internal ratio kn is added to the standard internal ratio kd (step S17) to set a new internal ratio, and the variable n is incremented. The flow then returns to step S12. In this manner, internal ratios are repeatedly generated by feedback processing so as to eliminate any difference between a signal width dn obtained with the threshold thn and a standard signal width dr, thereby generating an optimal internal ratio. A threshold is generated on the basis of the optimal internal ratio.

According to this threshold determination/binarization circuit of the second embodiment, by detecting a degraded reference dot diameter (width in the case of a one-dimensional code; diameter in the case of a two-dimensional code using a circle as a standard signal), an internal ratio which makes the standard signal width of the degraded signal be an optimal (target) value is obtained. In addition, if the internal ratio is adjusted and a threshold is obtained to make the reference dot diameter be an optimal value, similar binarization results can be obtained with respect to degraded signals obtained through media having different transfer characteristics.

Figure 5:
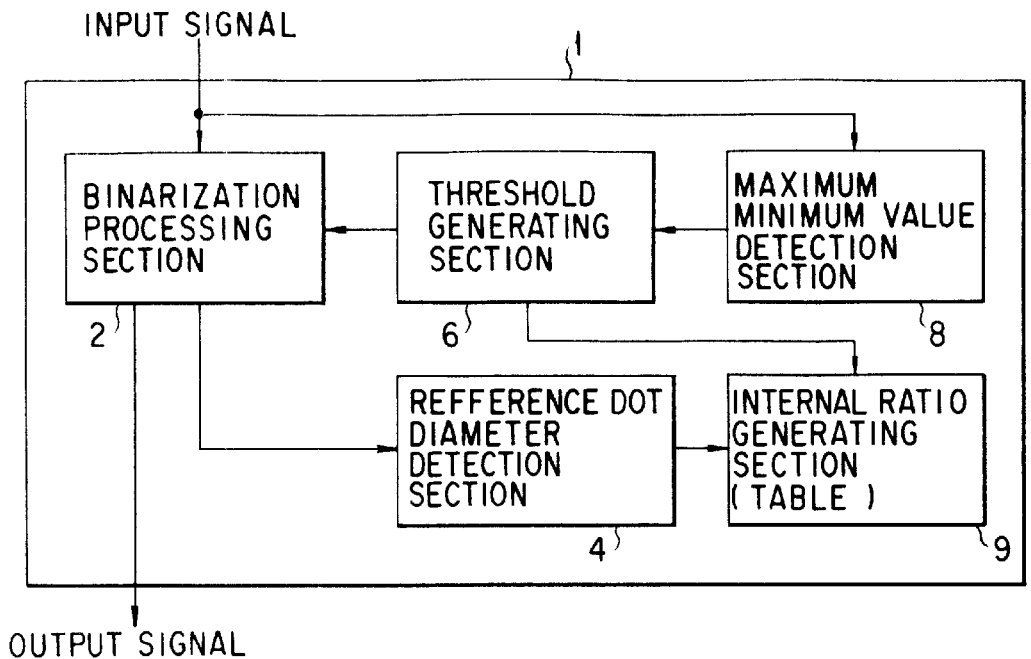
FIG. 5 is a block diagram showing the arrangement of a threshold determination/binarization circuit as the third embodiment of the present invention.

FIG. 5 shows the arrangement of a threshold determination/binarization circuit as the third embodiment of the present invention.

A threshold determination/binarization circuit 1 comprises a binarization processing section 2 for binarizing a dot code from an interpolation circuit on the preceding stage, a maximum/minimum value detection section 8 for detecting the maximum and minimum values of the dot code (reference dot), a reference dot diameter detection section 4 for detecting a reference dot diameter dn, an internal ratio generating section 9 for sequentially generating internal ratios on the basis of the reference dot diameter dn from the reference dot diameter detection section 4, and a threshold generating section 6 for generating a threshold thn on the basis of each of the internal ratios and the maximum and minimum values. The internal ratio generating section 9 has a counter function and a table or the like in which a slope a and a standard signal width dr in FIG. 6 (to be described later) are stored.

Figure 6:
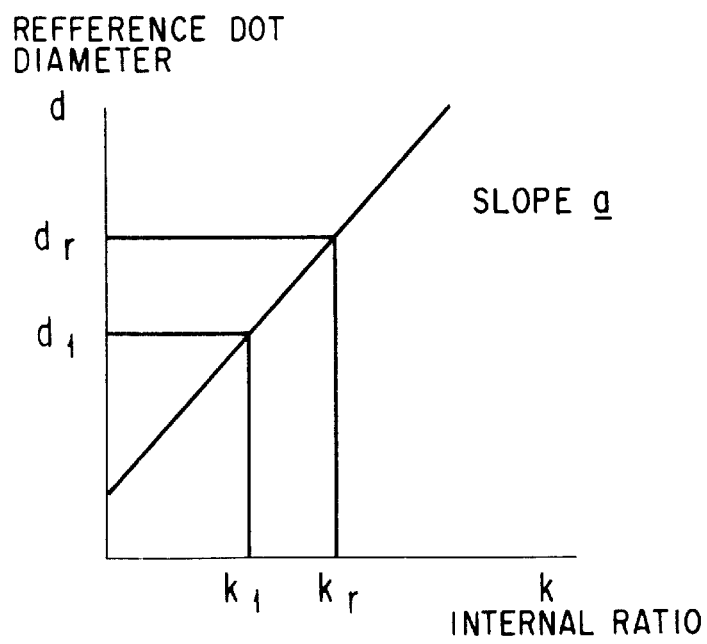
FIG. 6 is a graph showing the relationship between the internal ratio and the reference dot diameter.

In this embodiment, if transfer characteristics are limited to obtain a constant slope like the slope a in FIG. 6, in consideration of the relationship between the internal ratio (K) and the reference dot diameter (D), a necessary internal ratio can be obtained from one reference dot diameter. Consider recording sheets having different paper qualities. In this case, even if different exposure amounts are set for printing operations, equation (2) as a condition can be satisfied as far as the same paper surface is concerned:

$$Kr = (dr - d1)/a + k1 \quad (2)$$

Figure 7:
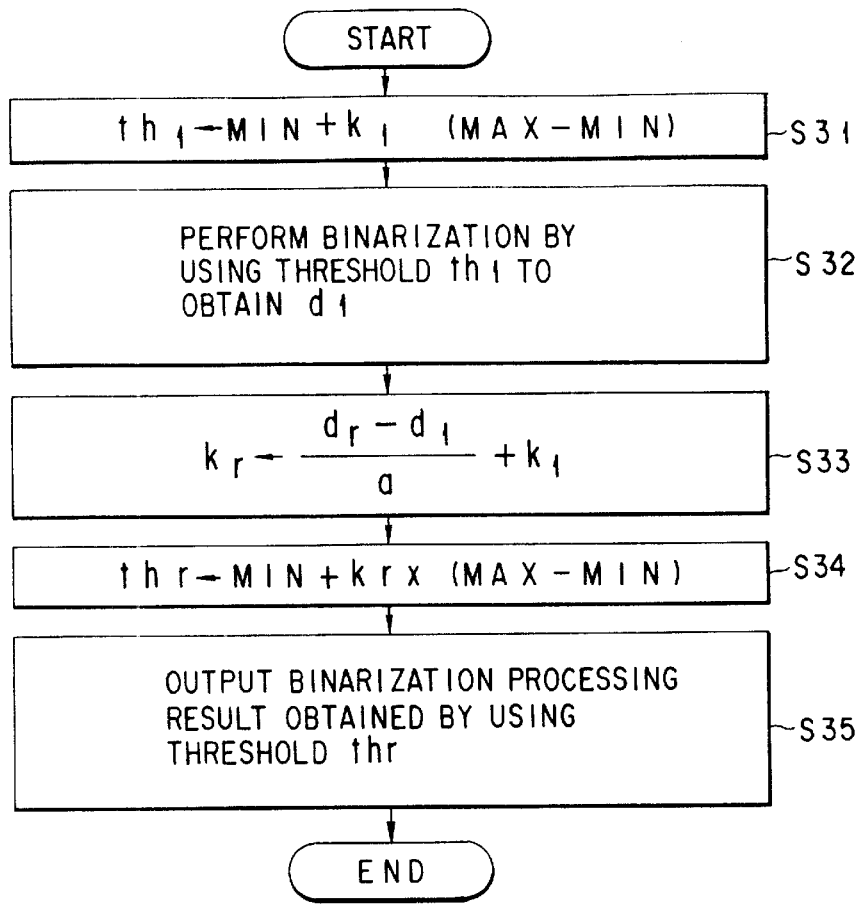
FIG. 7 is a flow chart for explaining the operation of the threshold determination/binarization circuit of the third embodiment.

The operation of this embodiment will be described next with reference to the flow chart of FIG. 7.

First of all, a threshold th1 is obtained from a predetermined internal ratio k1 according to the following expression (step S31):

$$th1 \leftarrow MIN + Kr \times (MAX - MIN) \quad (3)$$

Binarization is performed on the basis of this threshold th1 to obtain a reference dot d1 (step S32). An internal ratio kr is calculated according to equation (2) described above (step S33). A threshold thr is obtained on the basis of the calculated internal ratio k3 according to expression (3) described above (step S34). The binarization processing section 2 performs binarization by using the threshold thr and outputs the resultant data (step S35).

Figure 8:
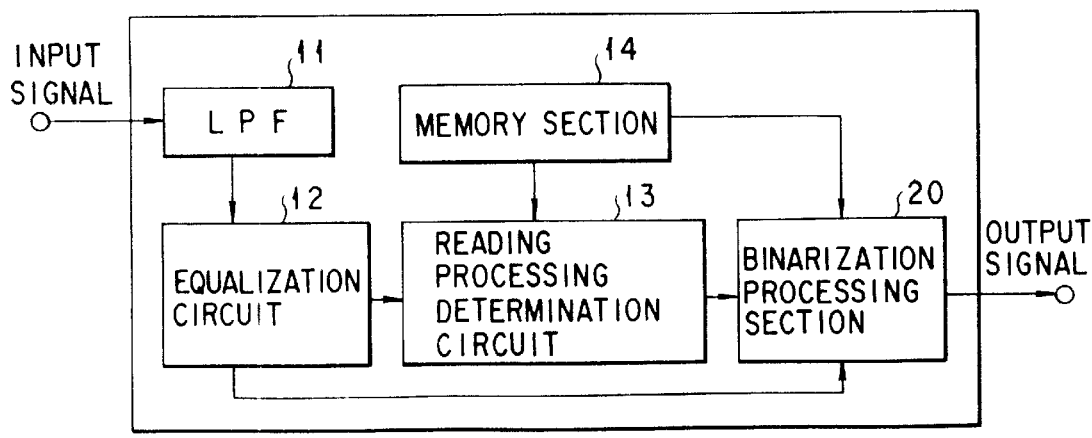
FIG. 8 is a block diagram showing the arrangement of a threshold determination/binarization circuit as the fourth embodiment of the present invention.

FIG. 8 shows the arrangement of a threshold determination/binarization circuit as the fourth embodiment of the present invention.

In the fourth embodiment, a threshold is generated from the average value of the diameters of a plurality of markers by using makers on a recording sheet as reference dots.

A threshold determination/binarization circuit 1 comprises a low-pass filter (LPF) 11 for removing noise from a dot code (image signal level) from an interpolation circuit on the preceding stage, an equalization circuit 12 for compensating for waveform distortion and the like, a reading processing determination circuit 13 for comparing the minimum and maximum values of an image signal to be binarized with predetermined allowable upper and lower limit values (up and down values) corresponding to an image signal level, respectively, and determining interruption of processing when the image signal exceeds the upper and lower limits, a memory section 14 storing the allowable upper and lower limit values, and a binarization processing section 20 for performing binarization.

Figure 9:
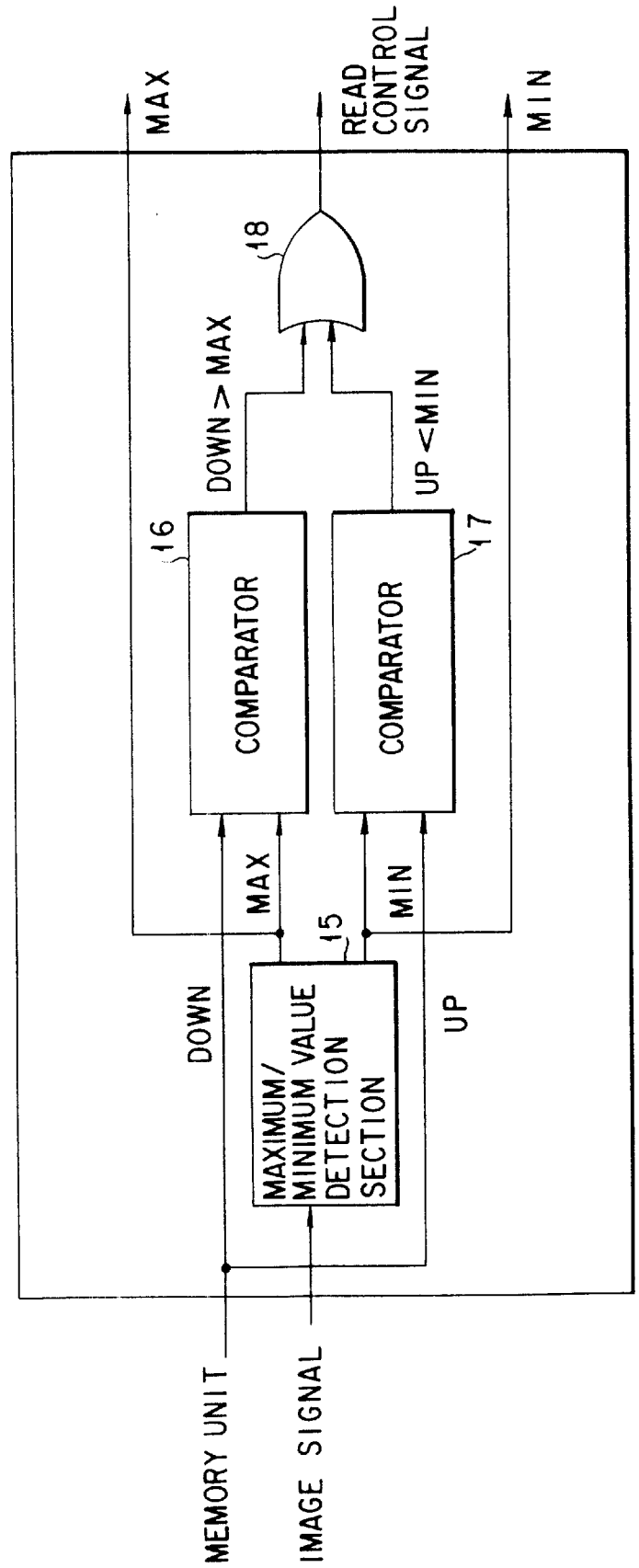
FIG. 9 is a block diagram showing an arrangement of a reading processing determination circuit in FIG. 8.

As shown in FIG. 9, the reading processing determination circuit 13 includes a maximum/minimum value detection section 15 for detecting the maximum and minimum values of an image signal to be binarized, a comparator 16 for comparing the allowable upper limit value, read out from the memory section 14, with the maximum value, i.e., determining whether the image is excessively white, and outputting the signal when the minimum value exceeds the upper limit, a comparator 17 for comparing the allowable lower limit, read out from the memory section 14, with the maximum value, i.e., determining whether the image is excessively dark, and outputting the signal when the maximum value exceeds the lower limit, and an OR circuit 18 for outputting a read control signal for designating interruption of reading processing when the comparator 16 or 17 outputs a signal.

FIG. 10 shows a detailed arrangement of the binarization processing section 20 in FIG. 8.

The binarization processing section 20 comprises a threshold generating section 21 for generating a threshold thn in accordance with an internal ratio k from the memory section 14 only in the first operation, or an internal ratio kr subsequently generated and a designation from the reading processing determination circuit 13, a binarization processing section 22 for binarizing a dot code (image signal level) from an interpolation circuit on the preceding stage on the basis of the threshold thn, a reference dot diameter detection section 23 for detecting a reference dot diameter dn from the dot code (reference dot), and an internal ratio generating section 24 for generating an internal ratio k1 on the basis of the reference dot diameter dn from the reference dot diameter detection section 23.

FIG. 11 shows a detailed arrangement of the reference dot diameter detection section 23 in FIG. 10.

The reference dot diameter detection section 23 includes a streak data calculation circuit 25 for calculating data used to recognize a marker by streak processing, a marker detection circuit 26 for outputting a marker from data, and an average marker diameter calculation circuit 27. A marker is defined as the largest dot in a dot code. For this reason, each marker is detected by using streak data near a known marker standard value, i.e., the average value of a plurality of data.

Figure 12:
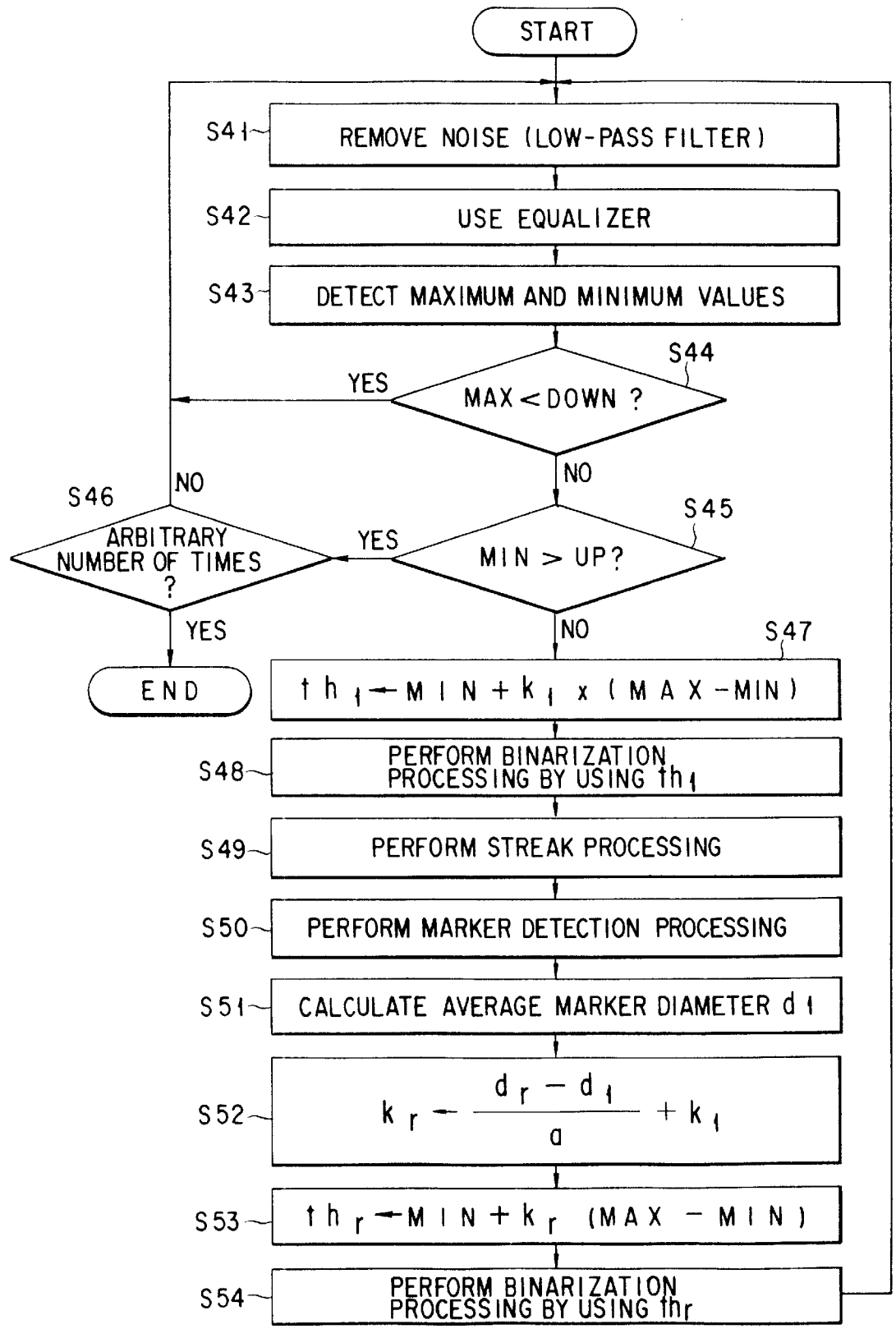
FIG. 12 is a flow chart for explaining the operation of the threshold determination/binarization circuit of the fourth embodiment.

The operation of the threshold determination/binarization circuit having this arrangement will be described next with reference to the flow chart of FIG. 12.

First of all, the LPF 11 removes noise from a dot code (image signal level) from the interpolation circuit (step S41).

The equalization circuit 12 then compensates for waveform distortion and the like (step S42). The maximum/minimum value detection section 15 detects the maximum and minimum values of the dot code (step S43).

The comparator 16 compares the maximum value with the allowable lower limit value (down value) (step S44). If it is determined that the allowable lower limit value is larger (YES), the flow returns to step S41. If it is determined that the allowable lower limit value is smaller (NO), the comparator 17 compares the minimum value with the allowable upper limit value (up value) (step S45). If it is determined that the allowable upper limit value is smaller (YES), it is checked whether this comparison is performed an arbitrary number of times, e.g., two times, (step S46). If it is determined that the comparison is performed less than two times (NO), the flow returns to step S41. If it is determined that the comparison is performed two times (YES), this series of processing is terminated. If it is determined in step S45 that the allowable upper limit value is larger (NO), a threshold th1 is generated from an internal ratio k1 (only in the first operation) and the maximum and minimum values (step S47).

Binarization processing of the dot code is performed by using this threshold th1 (step S48). Thereafter, streak processing is performed (step S49), and marker detection processing is performed (step S50). An average value d1 of the diameters of a plurality of detected makers is calculated (step S51). An internal ratio kr is obtained by using the obtained average value d1 (step S52). A new threshold thr is generated on the basis of the internal ratio kr and the maximum and minimum values (step S53). Binarization processing of the dot code is performed again by using this threshold thr (step S54). The flow then returns to step S41.

FIG. 13 shows an arrangement of a threshold determination/binarization circuit as the fifth embodiment of the present invention.

A threshold determination/binarization circuit 1 comprises a binarization processing section 2 for binarizing a dot code (image signal level) from an interpolation circuit on the preceding stage with a threshold, a frame counter 28 for counting input data of the dot code in units of frame images (to be referred to as frames hereinafter), a maximum/minimum value detection section 8 for detecting the maximum and minimum values of the reference dot, a reference dot diameter detection section 4 for detecting a reference dot diameter dn, an internal ratio generating section 9 (equivalent to the internal ratio generating section 9 in the third embodiment) for generating an internal ratio on the basis of the reference dot diameter dn and a frame count from the frame counter 28, and a threshold generating section 6 for generating a threshold thn from the generated internal ratio and the maximum and minimum values.

In this fifth embodiment, the frame counter 28 counts input image levels in units of frames, and the reference dot diameter detection section 4 outputs a reference dot diameter when a reference dot is present within a frame, and outputs a non-detection signal when no reference dot is present. The internal ratio generating section 9 generates an internal ratio in the frame. The threshold generating section 6 then generates a threshold from the internal ratio.

As shown in FIG. 14, in frame 1, a threshold is generated by using a predetermined internal ratio kinit. In frame 2, however, a new threshold th1 is generated by using an internal ratio k1 based on the reference dot diameter obtained in frame 1. In frame 3, a new threshold th2 is generated by using an internal ratio k2 obtained in frame 2.

If, however, no reference dot is detected in the previous frame, and no internal ratio can be generated, a threshold is generated by using a threshold obtained two frames ago. Assume that the internal ratio k2 cannot be generated in frame 2. In this case, a threshold in frame 3 is generated by using the internal ratio k1 generated in frame 1.

Figure 15:
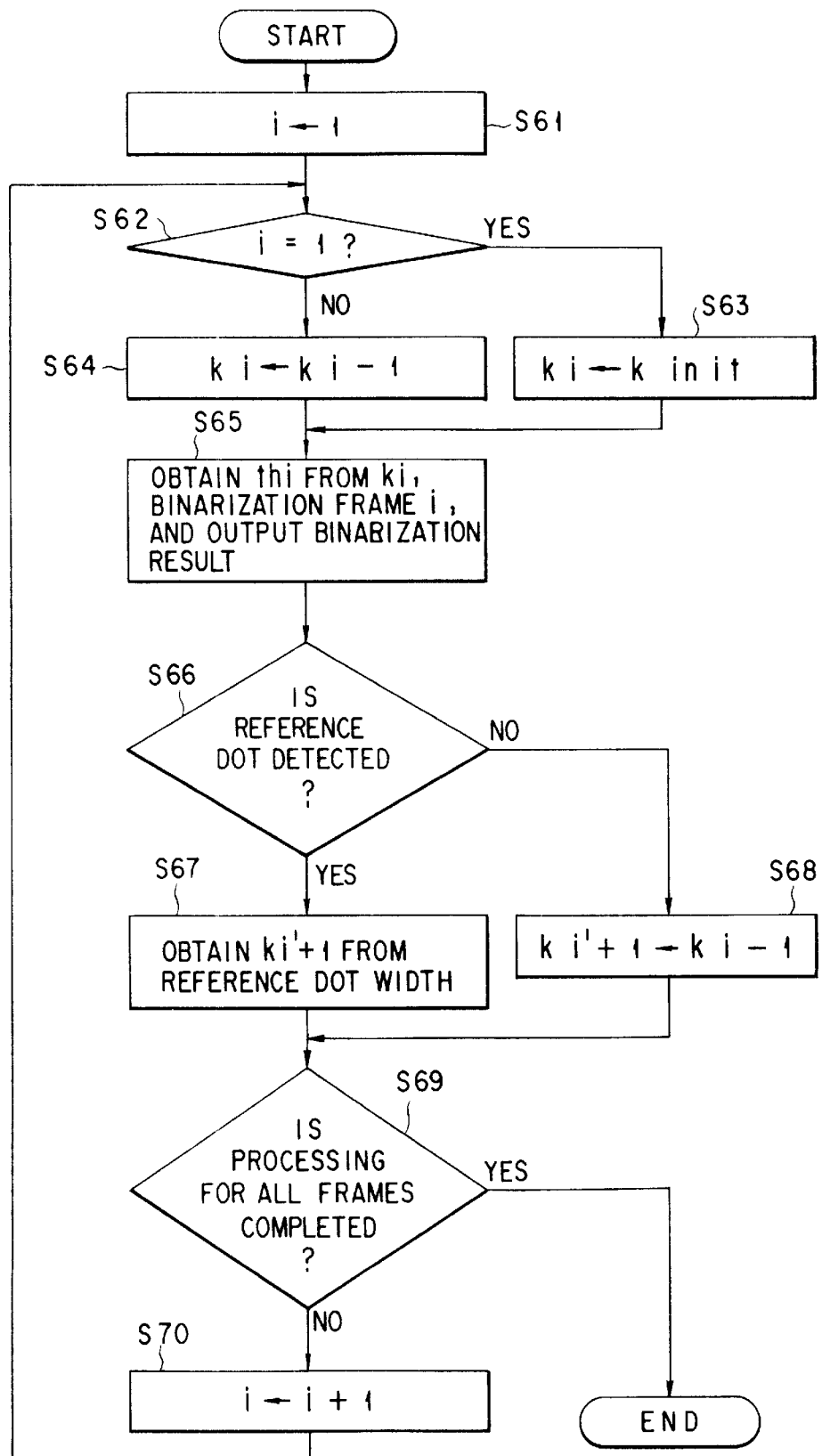
FIG. 15 is a flow chart for explaining the operation of the threshold determination/binarization circuit of the fifth embodiment.

This operation will be described with reference to the flow chart of FIG. 15.

Assume that a threshold in a frame i (i=1, 2, . . . ) is to be generated.

First of all, a variable (frame number) i is initialized to 1 (step S61). It is then checked whether the variable is set to 1 (step S62). If it is determined that the variable is set to 1 (YES), the predetermined internal ratio kinit is set to an initial value ki (step S63). If it is determined that the variable is not set to 1 (NO), an internal ratio (ki−1) generated in the previous frame is set to ki (step S64).

A threshold thi is obtained from the set internal ratio ki, binarization of the dot code (image signal level) in the frame i is performed, and the result is output (step S65). In this case, it is checked whether a reference dot is detected in the frame i (step S66). If it is determined that a reference dot is detected (YES), an internal ratio ki' used for a next frame i+1 is obtained on the basis of the reference dot diameter (step S67). If no reference dot is detected (NO), an internal ratio ki−1 generated in the previous frame is set as an internal ratio used for the next frame i+1 (step S68).

It is checked whether processing of all the frames is completed (step S69). If it is determined that the processing is not completed (NO), the variable i is incremented (step S70), and the flow returns to step S62. If it is determined that the processing is completed (YES), the processing of this routine is terminated.

The sixth embodiment of the present invention will be described next.

Figure 16:
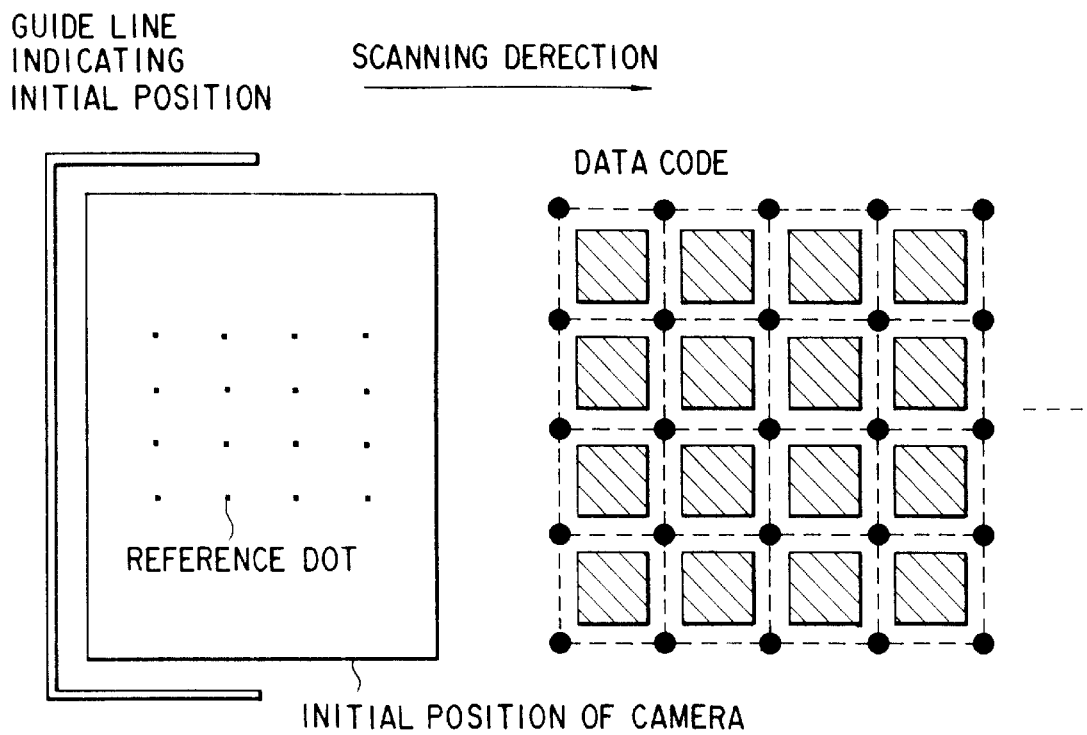
FIG. 16 is a view showing an arrangement (format) of reference dots on a recording sheet used in the sixth embodiment of the present invention.

In the sixth embodiment, on a recording sheet like the one shown in FIG. 16, reference dots are arranged in empty areas each located before a reading start end such that the reference dots are read before data codes. A plurality of reference dots are arrayed in an area surrounded by a guide line indicating the initial position (first frame) of the camera.

Figure 17:
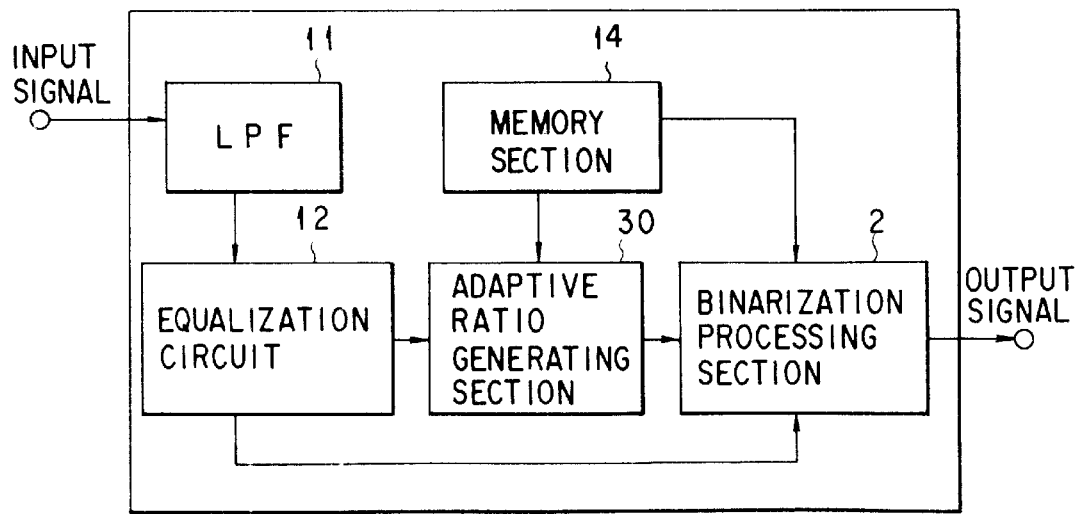
FIG. 17 is a block diagram showing the arrangement of a threshold determination/binarization circuit as the sixth embodiment.

As shown in FIG. 17, a threshold determination/binarization circuit 1 comprises a low-pass filter (LPF) 11 for removing noise from a dot code (image signal level) from an interpolation circuit on the preceding stage, an equalization circuit 12 for compensating for waveform distortion and the like, an adaptive threshold detection section 30 for detecting the maximum and minimum values of the image signal level, and generating a threshold on the basis of an internal ratio kr generated from a reference dot diameter, a memory section 14 storing an internal ratio k1 used for the first operation, an allowable upper limit value (up value), and an allowable lower limit value (down value), and a binarization processing section 2 for binarizing the dot code on the basis of the threshold.

As shown in FIG. 18, the adaptive threshold detection section 30 includes a maximum/minimum value detection section 15 for detecting the maximum and minimum values of an image signal representing a dot code, a threshold generating section 31 for generating a threshold from the internal ratio k1 and the maximum and minimum values which are read out from the memory section 14, a binarization processing section 32 for binarizing the image signal representing the dot code on the basis of the threshold, a reference dot detection section 33 for calculating a reference dot diameter from the binary data, and an internal ratio generating section 34 for generating a new internal ratio kr from the reference dot diameter.

As shown in FIG. 19, the reference dot detection section 33 includes a reference dot position setting section 35 for setting the position of a detected reference dot, a streak data calculation section 36 for performing streak processing of the reference dot at the set position, and an average reference dot diameter calculation section 37 for calculating the average reference dot diameter in units of frames.

As shown in FIG. 20, the binarization processing section 2 includes a reading processing determination circuit 13 for reading out allowable upper and lower limit values, stored in advance in accordance with an image signal level, from the memory section 14, comparing the minimum and maximum values of an image signal to be binarized with the allowable upper and lower limit values (up and down values), respectively, and determining interruption of processing when the image signal exceeds the upper and lower limits, a threshold generating section 21 for generating a threshold kr on the basis of the internal ratio kr and the maximum and minimum values from the adaptive threshold detection section 30, and a binarization processing section 22 for binarizing the image signal level on the basis of the threshold thr.

Figure 21:
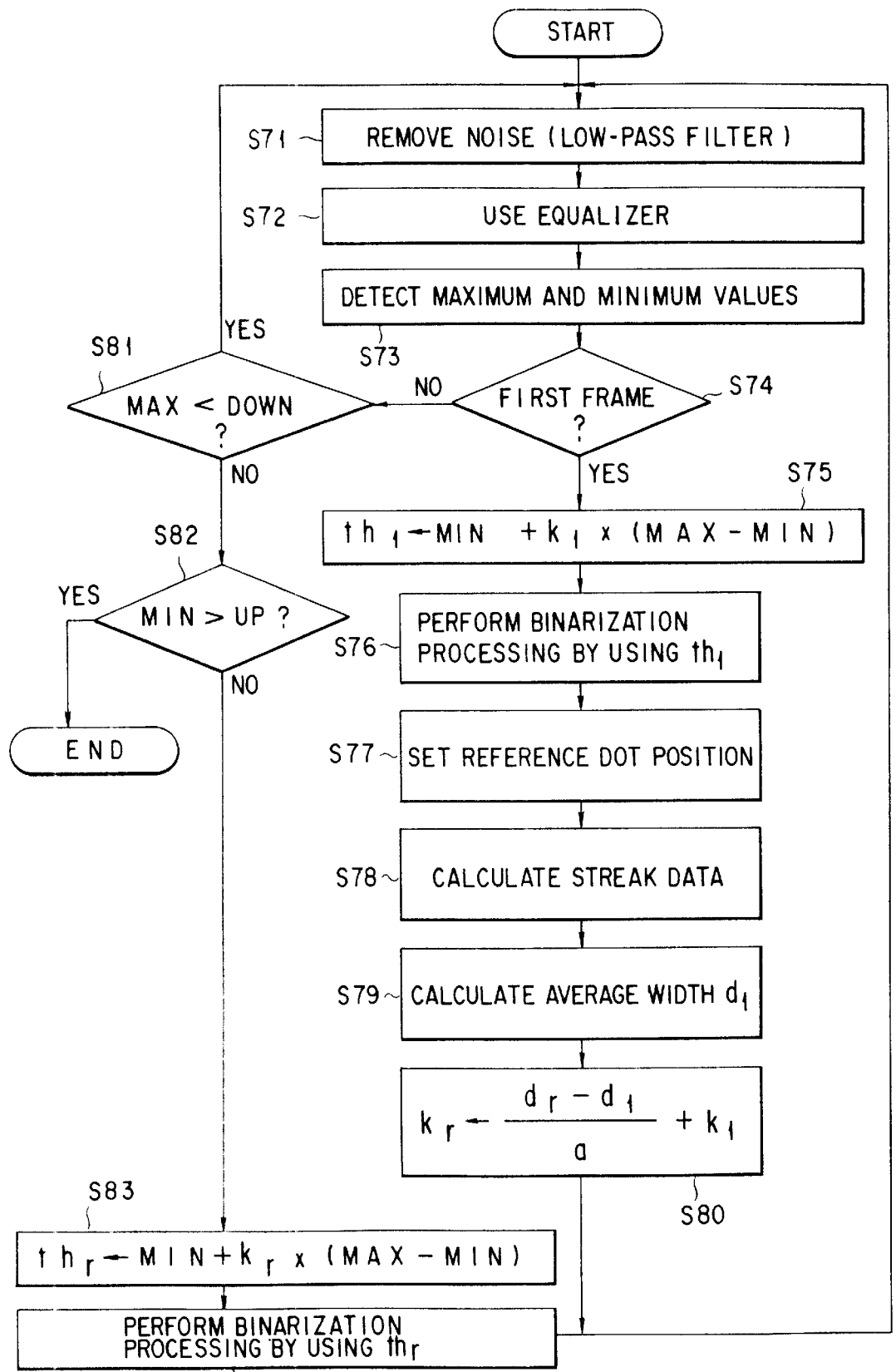
FIG. 21 is a flow chart for explaining the operation of the threshold determination/binarization circuit of the sixth embodiment.

The operation of the threshold determination/binarization circuit having this arrangement will be described with reference to the flow chart of FIG. 21.

First of all, the LPF 11 removes noise from a dot code (image signal level) from the interpolation circuit (step S71). The equalization circuit 12 then compensates for waveform distortion and the like (step S72). The maximum/minimum value detection section 15 detects the maximum and minimum values of the dot code (step S73).

It is checked whether the current frame is the first frame (step S74). If the first frame is determined (YES), a threshold th1 is generated on the basis of the internal radio k1 and the maximum and minimum values (step S75). Binarization of the dot code (image signal level) is performed by using this threshold th1 (step S76). A reference dot position is set (step S77). Thereafter, streak processing is performed (step S78). An average value d1 of reference dot diameters is calculated (step S79). A new internal ratio kr is generated on the basis of this average value d1 (step S80). The flow then returns to step S71.

If it is determined in step S74 that the current frame is not the first frame (NO), the maximum value is compared with the allowable lower limit value (down value) (step S81). If the allowable lower limit value is larger (YES), the flow returns to step S71. If the allowable lower limit vale is smaller (NO), the minimum value is compared with the allowable limit value (up value) (step S82). If it is determined that the allowable upper limit value is smaller (YES), the processing of this routine is terminated. If it is determined that the allowable upper limit value is larger (NO), a threshold thr is generated on the basis of the previously obtained internal ratio kr and the maximum and minimum values (step S83). Binarization processing of the dot code is performed by using this threshold thr (step S84), and the flow returns to step S71.

A threshold determination/binarization circuit as the seventh embodiment of the present invention will be described next.

In the seventh embodiment, as shown in FIG. 22, on a recording sheet, a plurality of attribute dots, each containing information associated with the recording sheet and recording processing (e.g., an exposure value in recording processing) and the like, are arranged in empty areas each located before a reading start end such that the attribute dots are read before data codes, i.e., in an area surrounded by a guide line indicating the initial position (first frame) of the camera.

As shown in FIG. 23, this threshold determination/binarization circuit comprises a low-pass filter (LPF) 11 for removing noise from a dot code (image signal level) from an interpolation circuit on the preceding stage, an equalization circuit 12 for compensating for waveform distortion and the like, a memory section 14 an internal ratio kr corresponding to each attribute dot and allowable upper and lower limit values (up and down values) corresponding to an image signal level in advance, an attribute dot detection section 38 for detecting an attribute dot code, and a binarization processing section 39 for detecting the maximum and minimum values from an image signal level, obtaining the internal ratio kr on the basis of the detected attribute code, calculating a threshold, and binarizing the dot code on the basis of the threshold.

As shown in FIG. 24, the binarization processing section 39 includes a processing determination circuit 40 for reading out the allowable upper and lower limit values from the memory section 14, comparing the minimum and maximum values of the image signal level to be binarized with the allowable upper and lower limit values (up and down values), respectively, and determining interruption of processing when the image signal exceeds the upper and lower limits, a threshold generating section 41 for reading out the internal ratio kr, corresponding to the attribute dot detected by the attribute dot detection section 38, from the memory section 14, and generating a threshold thr on the basis of the internal ratio kr and the maximum and minimum values, and a binarization processing section 42 for binarizing the image signal level on the basis of the threshold thr.

The operation of the threshold determination/binarization circuit of the seventh embodiment will be described with reference to the flow chart of FIG. 25.

First of all, the LPF 11 removes noise from a dot code (image signal level) from the interpolation circuit (step S91). The equalization circuit 12 then compensates for waveform distortion and the like (step S92).

It is checked whether the current frame is the first frame (step S93). If the first frame is determined (YES), the internal ratio kr is generated on the basis of an attribute dot detected by the attribute dot detection section 38 (step S94). The threshold thr is generated from the maximum and minimum values (step S95). The dot code (image signal level) is binarized by using this threshold thr (step S96). The flow then returns to step S91.

If it is determined in step S93 that the current frame is not the first frame (NO), the maximum value is compared with the allowable lower limit (down value) (step S97). If it is determined that the allowable lower limit value is larger (YES), the flow returns to step S91. If it is determined that the allowable lower limit value is smaller (NO), the minimum value is compared with the allowable upper limit value (up value) (step S98). If it is determined that the allowable upper limit value is smaller (YES), the processing of this routine is terminated. If, however, it is determined that the allowable upper limit value is larger (NO), the flow advances to step S95 to generate the threshold thr.

A threshold determination/binarization circuit as the eighth embodiment of the present invention will be described next.

Figure 26:
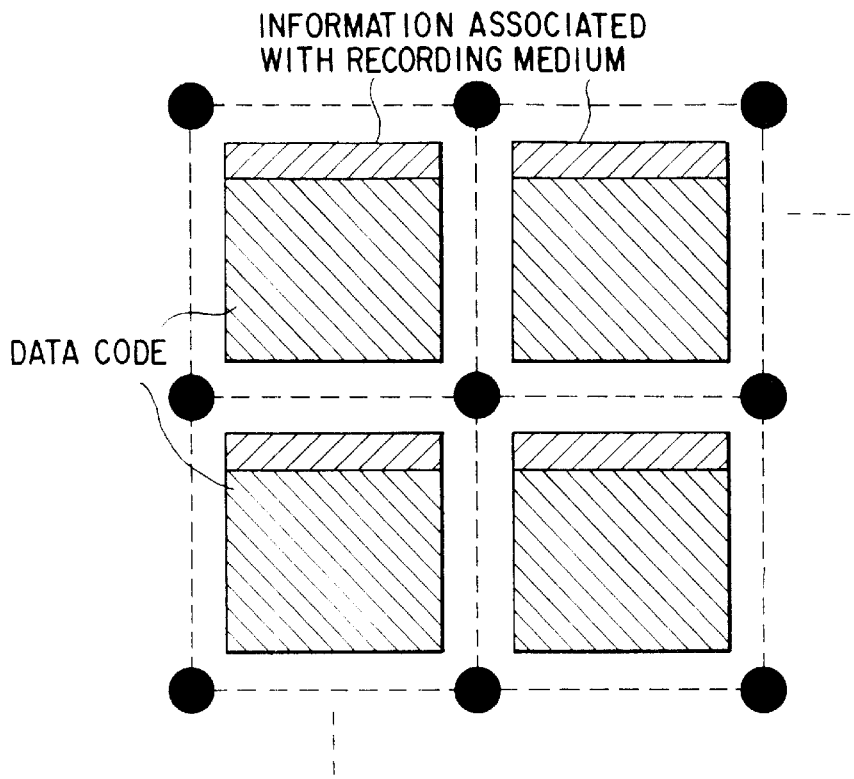
FIG. 26 is a view showing an arrangement (format) of attribute dots on a recording sheet in the eighth embodiment of the present invention.

The eighth embodiment is applied to a recording sheet like the one shown in FIG. 26. On this recording sheet, an attribute dot containing information, as header information, associated with the recording sheet and recording processing is recorded in the start area (upper area in FIG. 26) of each data code.

Figure 27:
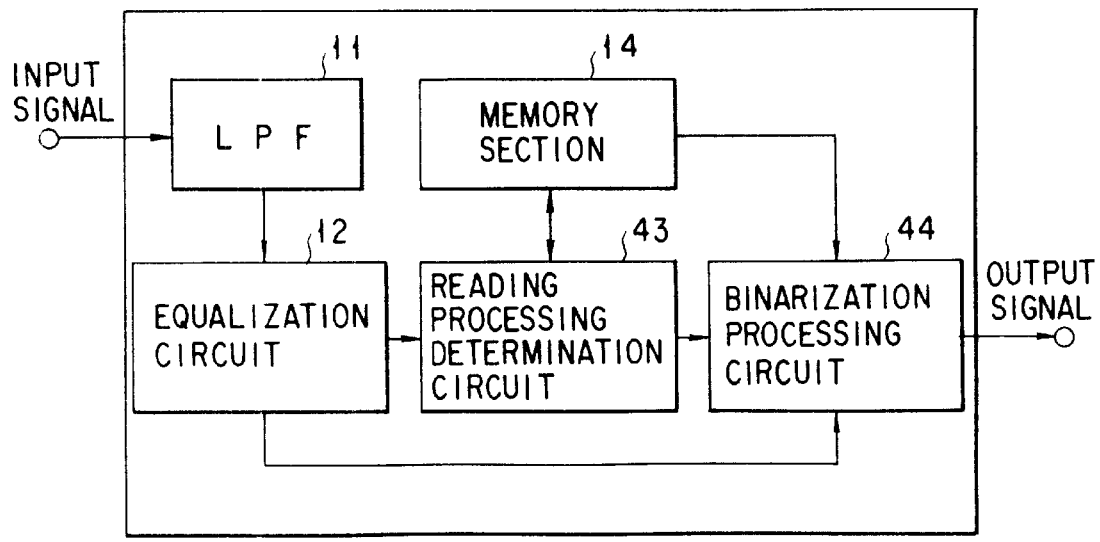
FIG. 27 is a block diagram showing the arrangement of a threshold determination/binarization circuit as the eighth embodiment.

As shown in FIG. 27, this threshold determination/binarization circuit comprises a low-pass filter (LPF) 11 for removing noise from a dot code (image signal level) from an interpolation circuit on the preceding stage, an equalization circuit 12 for compensating for waveform distortion and the like, a memory section 14 storing allowable upper and lower limit values corresponding to an image signal level in advance, a processing determination circuit 43 for comparing the minimum and maximum values of an image signal to be binarized with the allowable upper and lower limit values (up and down values), and determining interruption of processing when the image signal exceeds the upper and lower limits, and a binarization processing circuit 44 for performing binarization. The processing determination circuit 43 is equivalent to the reading processing determination circuit 13 described above.

FIG. 28 shows a detailed arrangement of the binarization processing circuit 44 in FIG. 27.

The binarization processing circuit 44 includes a threshold generating section 45 for generating a threshold th in accordance with an internal ratio k1 only in the first operation or a subsequently generated internal ratio kr and a designation from the processing determination circuit 43, a binarization processing section 46 for binarizing a dot code (image signal level) from the interpolation circuit on the preceding stage, a header information detection section 47 for detecting header information from the dot code, and an internal ratio generating section 48 for generating an internal ratio kr on the basis of the header information from the header information detection section 47.

An arrangement of the header information detection section 47 will be described with reference to FIG. 29.

The header information detection section 47 includes a streak data calculation section 49 for calculating streak data from the data binarized by the binarization processing section 46, a marker detection section 50 for detecting a marker in the calculated streak data, a PCD detection section 51 for detecting a pattern code for detecting a marker center, a true marker center detection section 52 for detecting the true center of the marker detected on the basis of the pattern code, and a header information reading section 53 for reading out header information on the basis of the position of the marker.

Figure 30:
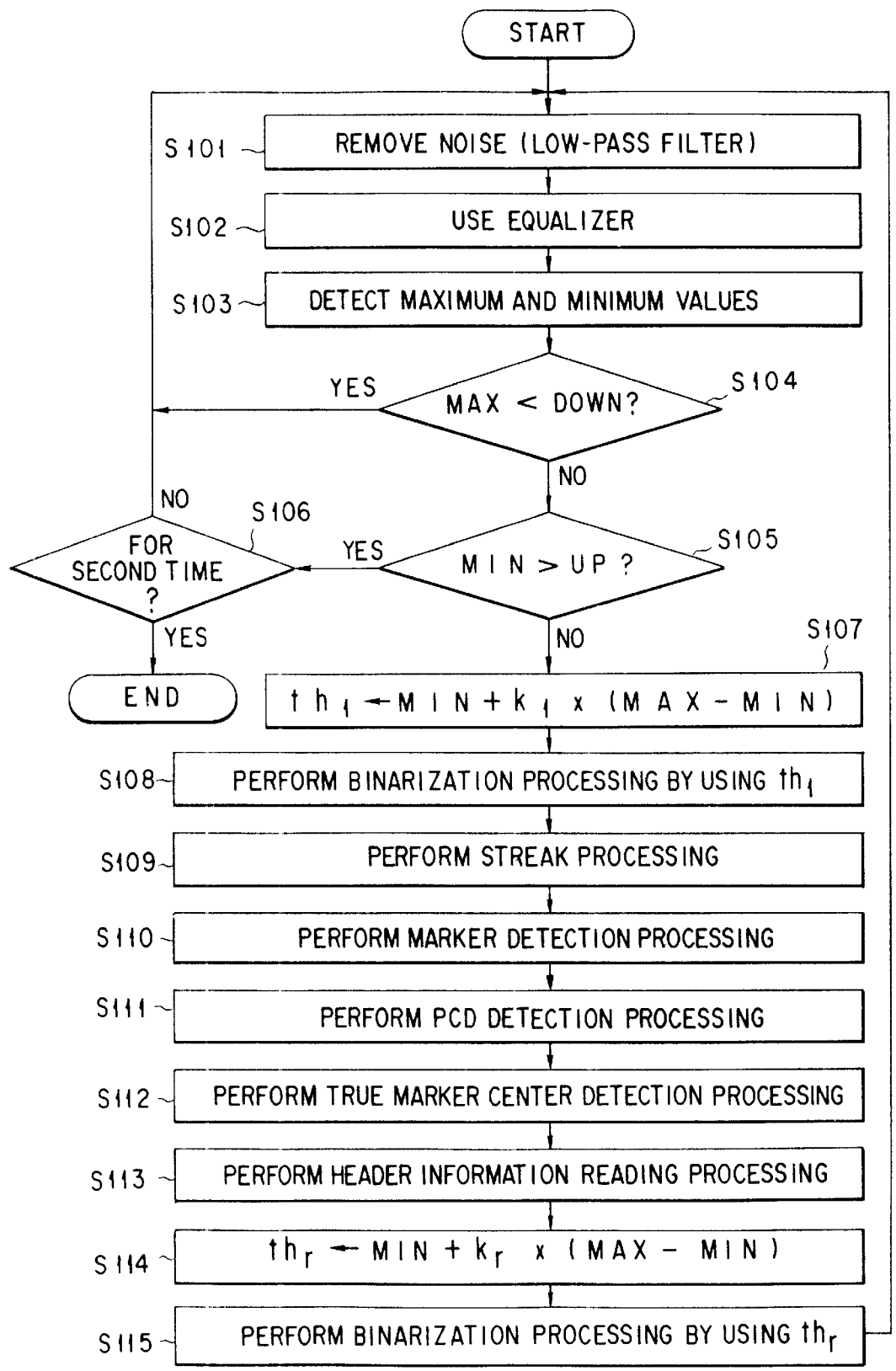
FIG. 30 is a flow chart for explaining the operation of a threshold determination/binarization circuit of the eighth embodiment.

The operation of the threshold determination/binarization circuit of the eight embodiment will be described next with reference to the flow chart of FIG. 30.

First of all, the LPF 11 removes noise from a dot code (image signal level) from the interpolation circuit (step S101). The equalization circuit 12 then compensates for waveform distortion and the like (step S102). The maximum and minimum values are detected from the dot code (step S103).

The maximum value is compared with the allowable lower limit value (down value) (step S104). If it is determined that the allowable lower limit value is larger (YES), the flow returns to step S101. If, however, it is determined that the allowable lower limit value is smaller (NO), the minimum value is compared with the allowable upper limit value (up value) (step S105). If it is determined that the allowable upper limit value is smaller (YES), it is checked whether this comparison is performed two times (step S106). If it is determined that the comparison is performed less than two times (NO), the flow returns to step S101. If it is determined that the comparison is performed two times (YES), this series of processing is terminated. If, however, it is determined in step S105 that the allowable upper limit value is larger (NO), a threshold th1 is generated on the basis of the internal ratio k1 set only in the first operation and the maximum and minimum values (step S107).

Binarization processing of the dot code is performed by using this threshold th1 (step S108). Streak processing is then performed (step S109). Marker detection processing is performed (step S110). A pattern code is detected (step S111), and a true marker center is detected on the basis of the obtained pattern code (step S112). An attribute code contained in the header information is read out, and the corresponding internal ratio kr is obtained (step S113). A new threshold thr is generated on the basis of the internal ratio kr and the maximum and minimum values (step S114). Binarization processing of the dot code is performed again by using this threshold thr (step S115). The flow then returns to step S101. As described above, in this embodiment, dot codes (reference dots, markers, attribute dots, and the like) are read from a recording sheet, and thresholds are generated. However, the dot diameter and the printing density can be adjusted in a printing operation in accordance with paper quality and the like.

The ninth embodiment of the present invention in which the dot diameter is adjusted in a printing operation will be described.

Figure 31A:
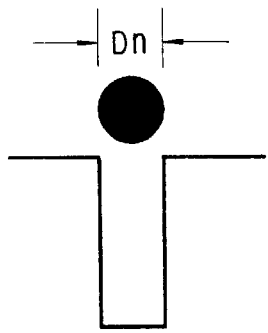
FIGS. 31A to 31C are views for explaining the principle of the ninth embodiment of the present invention.
Figure 31B:
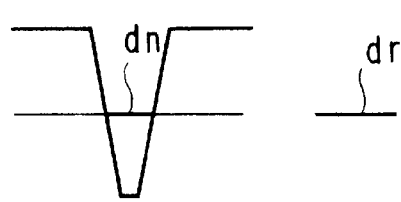
Figure 31C:
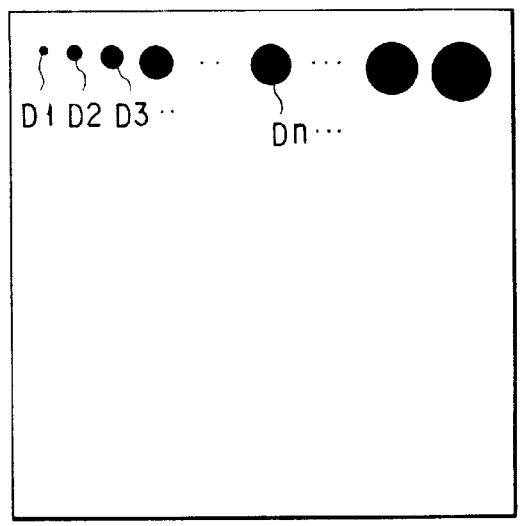

The dot diameter is adjusted in a printing operation in the following manner. As shown in FIGS. 31A to 31C, in order to find the specific resolution of a printer of interest, a group of dots are printed on printing paper with their diameters being gradually changed. A group of read dots are then compared with the printed dots, and a dot diameter with which the comparison result exhibits a value nearest to an ideal value is selected as a dot diameter to be set in a printing operation. For example, dots are recorded such that their dot diameters change in predetermined steps each corresponding to the minimum resolution of the printer.

Figure 33:
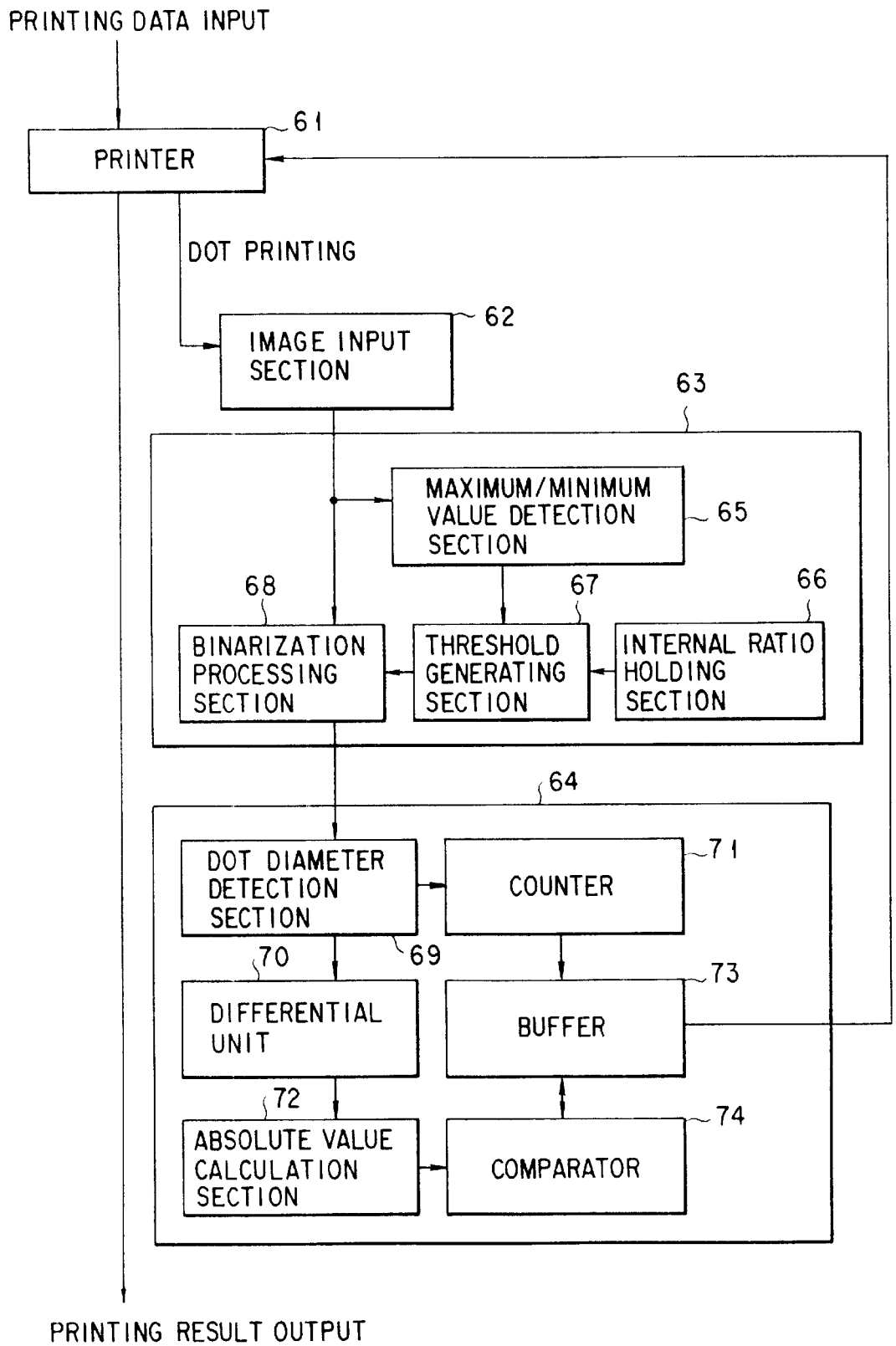
FIG. 33 is a block diagram showing the arrangement of a threshold determination/binarization circuit as the ninth embodiment.

FIG. 33 shows an arrangement of the ninth embodiment of the present invention.

The ninth embodiment mainly comprises a printer 61 for printing information on printing paper, an image input section 62, a binarization processing section 63, and a dot diameter determination section 64.

The binarization processing section 63 includes a maximum/minimum value detection section 65 for detecting the maximum and minimum values from a dot code from the image input section 62, an internal ratio holding section 66 for outputting a predetermined internal ratio which is to be used in the reproduction mode, a threshold generating section 67 for generating a threshold on the basis of the maximum and minimum values and the internal ratio, and a binarization processing section 68 for binarizing the dot code on the basis of the threshold.

The dot diameter determination section 64 includes a dot diameter detection section 69 for detecting a dot diameter dn from the binarized dot code, a differential unit 70 for calculating the difference between an optimal dot diameter dr and the dot diameter dn, a counter 71 for counting the detected dot diameters, an absolute value calculating section 72 for calculating the absolute value of the difference, a buffer 73 storing the minimum dot diameters of previously detected dots, and a comparator 74 for comparing the absolute value of the difference with the minimum value from the buffer 73. The minimum value nearest to the absolute value of the difference is output as an optimal dot diameter to the printer 61.

Figure 34:
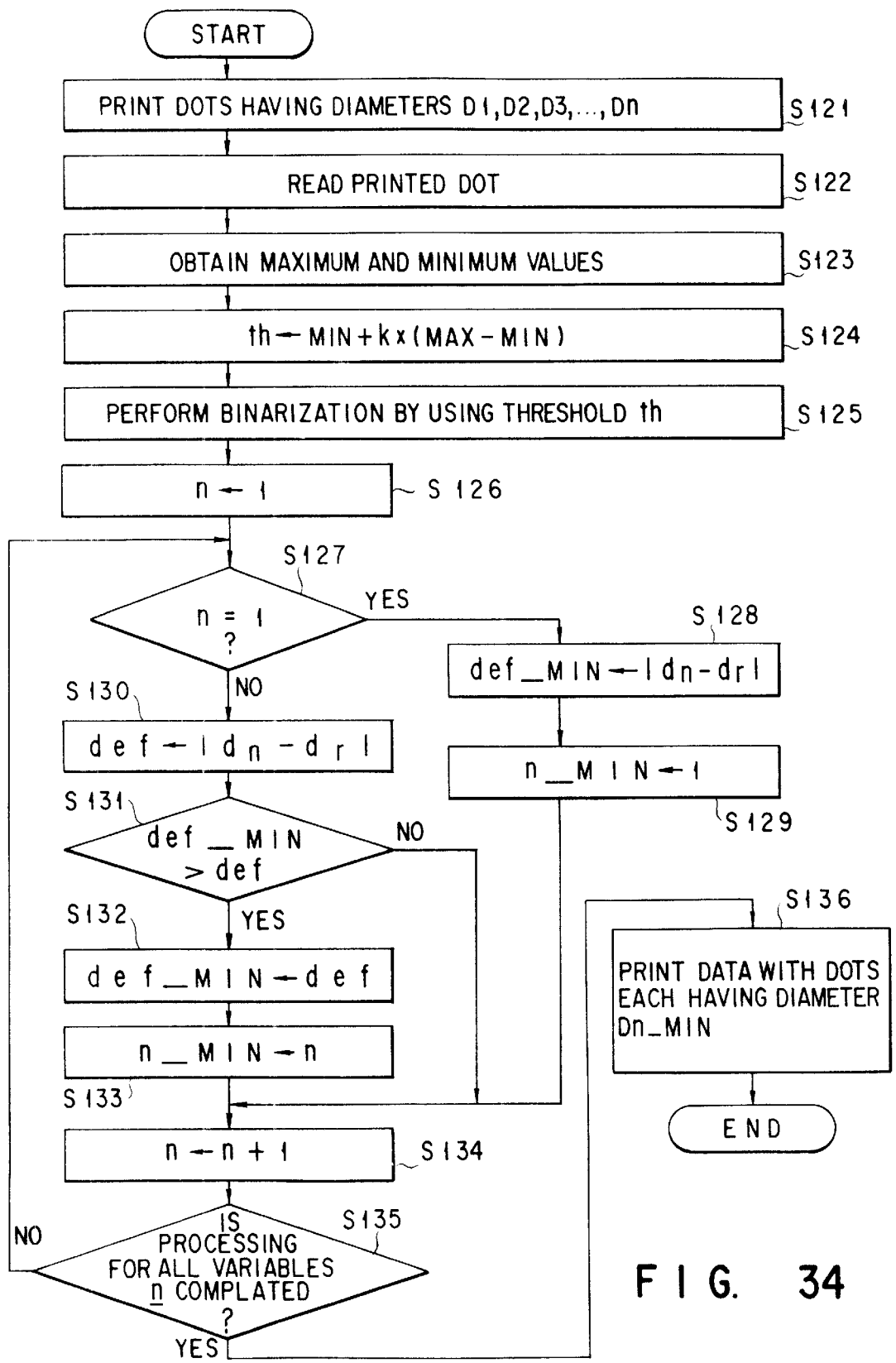
FIG. 34 is a block diagram for explaining the operation of the threshold determination/binarization circuit of the ninth embodiment.

The operation of the ninth embodiment having this arrangement will be described with reference to the flow chart of FIG. 34.

First of all, dots D1, D2, . . . , Dn having different diameters are printed (step S121). These printed dots are then read (step S122). A maxim value (max) and a minimum value (min) are obtained (step S123).

A threshold th is obtained by using the maximum and minimum values and a predetermined internal ratio k (step S124). Binarization of the dot code is performed by using this threshold th (step S125), and a variable n is set to 1 (step S126).

It is checked whether the variable n is 1 (step S127). If 1 is determined (YES), it indicates that the current operation is the first operation. In this case, the absolute value of the difference is the minimum value because there are no previous absolute values. The absolute value of the difference between the dot diameter dn read from the dot and the standard dot diameter dr is set as a minimum value def_min (step S128). At this time, a variable 1(n) is set to n_min (step S129), and the flow advances to step S134.

If it is determined in step S127 that the variable n is not 1 (NO), the absolute value of the difference between the dot diameter dn and the dot diameter dr is set as an absolute value def (step S130). This value def is compared with the previous minimum value def_min (step S131). If the minimum value def_min is larger (YES), the absolute value def is set as a new minimum value def_min (step S132), and the variable n is also set to n_min (step S133). The variable n is then incremented (step S134). If it is determined in step S131 that the minimum value def_min is smaller (NO), the minimum value is not changed, and the flow advances to step S134.

It is checked whether processing for all the variables n is completed (step S135). If the processing is not completed (NO), the flow returns to step S127). If the processing is completed (YES), printing of data is started with a dot diameter of dn_min (step S136).

FIG. 35 shows the 10th embodiment of the present invention in which the dot density is adjusted in a printing operation.

In the ninth embodiment, the dot diameter is adjusted in a printing operation. In contrast to this, in this embodiment, the dot density is adjusted. The same reference numerals in the 10th embodiment denote the same parts as in the ninth embodiment, and a description thereof will be omitted.

Figure 32A:
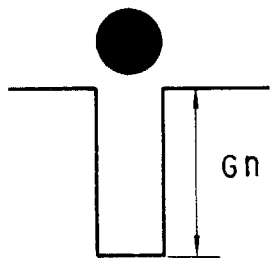
FIGS. 32A and 32B are views for explaining the principle of the 10th embodiment of the present invention.
Figure 32B:
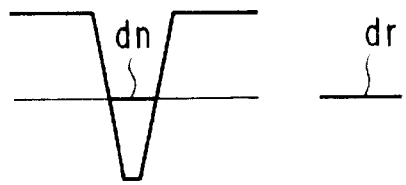

The dot density is adjusted in a printing operation in the following manner. As shown in FIGS. 32A and 32B, a printing density difference Gn that is empirically determined to be proper is set first as an initial value. Printing is then performed repeatedly until the printing density converges to a proper density value.

The 10th embodiment mainly comprises a printer 61, an image input section 62, a binarization processing section 63, and a dot density determination section 75.

The binarization processing section 63 is equivalent to the binary processing section in the ninth embodiment, and includes a maximum/minimum value detection section 65, an internal ratio holding section 66, a threshold generating section 67, and a binarization processing section 68.

The dot density determination section 75 includes a dot diameter detection section 69 for detecting a dot diameter dn, a differential unit 70 for calculating the difference between a dot diameter dr and the dot diameter dn, an absolute value calculation section 72 for calculating the absolute value of the difference, a comparator 76 for performing a comparing operation to determine whether the absolute value of the difference falls within a predetermined allowable range $\epsilon$, and a printing density designator 77 for designating a printing density on the basis of the difference if the absolute value of the difference falls within the predetermined allowable range $\epsilon$.

Figure 36:
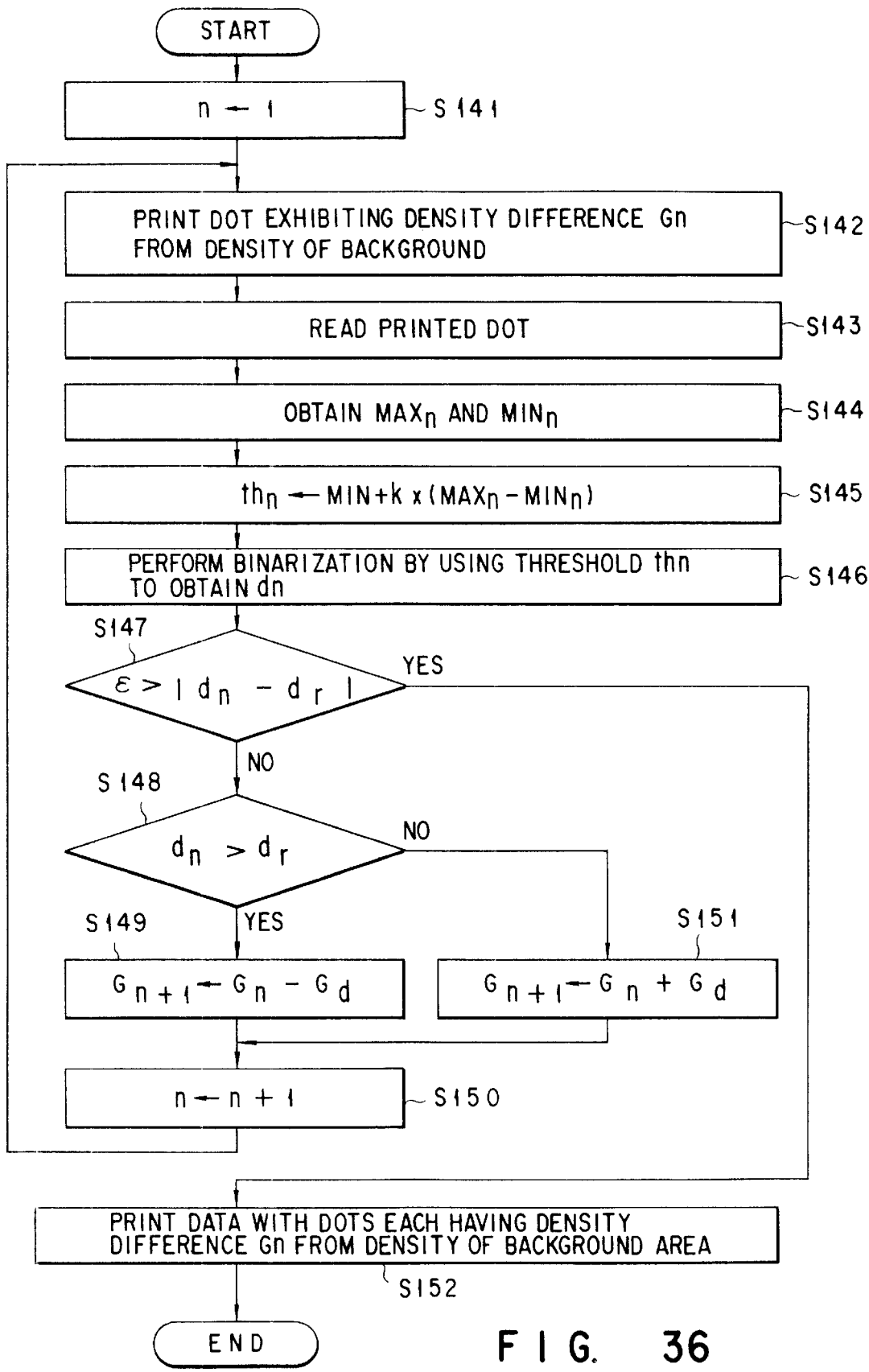
FIG. 36 is a flow chart for explaining the operation of the threshold determination/binarization circuit of the 10th embodiment.

The operation of the 10th embodiment having this arrangement will be described with reference to the flow chart of FIG. 36.

First of all, a variable n is set to 1 (step S141). A dot exhibiting a density difference Gn from the density of the background area is printed (step S142). The printed dot is read (step S143). Maximum and minimum values $max_n$ and $min_n$ are obtained (step S144). A threshold thn is obtained by using the maximum and minimum values and a predetermined internal ratio which is to be used in the reproduction mode (step S145). Binarization of the dot code is performed by using this threshold thn (step S146). It is checked whether the absolute value of the difference between the standard dot diameter dr and the read dot diameter dn falls within a predetermined allowable range $\epsilon$ (step S147). If it is determined that the absolute value falls within the predetermined allowable range $\epsilon$ (NO), the dot diameter dr is compared with the dot diameter dn (step S148).

If it is determined upon this comparison that the dot diameter dn is larger (YES), the difference between the density difference Gn with the dot diameter dn and a density difference Gd with the dot diameter dr is set as a new density difference Gn+1 (step S149), and the variable n is incremented (step S150). If it is determined that the dot diameter dr is larger (YES), the sum of the density difference Gn and the density difference Gd is set as a new density difference Gn+1 (step S151), and the flow advances to step S150.

If it is determined in step S147 that the absolute value of the difference falls within the predetermined allowable range $\epsilon$ (YES), the data is printed with dots each exhibiting the density difference Gn from the density of the background area (step S152).

The 11th embodiment of the present invention will be described next. In the ninth and 10 th embodiments, the dot diameter and the printing density of a dot are adjusted by performing a test printing operation once. Assume that the correspondence between the known types of paper and densities (exposure amounts) obtained by printing is known, as shown in FIG. 37. In this case, if a correspondence table is generated and stored in a personal computer or the like in advance, a dot diameter for a printing operation can be easily designated with respect to the printer on the basis of information associated with a designated type of paper and the corresponding density (exposure amount) in printing.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information reproduction system comprising:
   reading means for reading a dot code from a recording medium on which multimedia information including at least one of audio information, image information and digital code data is recorded as an optically readable dot code;
   binarization means for binarizing an image signal corresponding to the dot code read by the reading means using a threshold so as to produce binary image data; and
   restoring means for restoring data as original multimedia information by reading a dot code from the binary image data produced by the binarization means,
   said recording medium including a plurality of reference dots used by said binarization means for determining said threshold, and
   said binarization means including:
      means for detecting maximum and minimum values of an image signal level corresponding to the dot code;
      means for setting an internal ratio representing a ratio between the maximum and minimum values of the image signal level;
      means for calculating the threshold using the internal ratio and the maximum and minimum values of the image signal level;
      reference dot detection means for detecting the reference dots from the binary image data based on the calculated threshold; and
      threshold setting means for determining an estimation value based on diameters of the reference dots detected by the reference dot detection means, for comparing the estimation value with a predetermined reference value and for re-setting the threshold by varying the internal ratio such that a difference between the estimation value and the predetermined reference value becomes equal to a predetermined target value.

2. An information reproduction system according to claim 1, wherein said threshold setting means includes means for resetting the threshold such that the difference between the estimation value and the reference value becomes equal to a predetermined reference value, each time the internal ratio is reset.

3. An information reproduction system according to claim 1, wherein said threshold setting means includes means for calculating an internal ratio such that the difference between the estimation value and the predetermined reference value becomes equal to a predetermined target value, based on relationship information between the internal ratio and the estimation value.

4. An information reproduction system according to claim 1, wherein the dot code recorded on the recording medium includes a data code corresponding to the multimedia information and a pattern code used for determining a read reference point of the data code, and wherein said pattern code comprises the reference dots.

5. An information reproduction system according to claim 4, wherein said pattern code is used for determining a reference point which is referred to when a data code read point is determined, and wherein said pattern code includes a plurality of dots and a marker which is different in size from the dots.

6. An information reproduction apparatus according to claim 5, wherein said reference dot detection means includes marker detection means for detecting at least one of the markers of the optically read dot code.

7. An information reproduction apparatus according to claim 1, wherein said estimation value is an average value of the diameters of the reference dots.

8. An information reproduction apparatus according to claim 1, wherein said binarization means includes allowable upper and lower limit values for an image signal level corresponding to a read dot code, and means for stopping subsequent processing of the image signals when a minimum value of the image signal level to be binarized is larger than the allowable upper limit value or when a maximum value of the image signal level is lower than the allowable lower limit value.

9. An information reproduction apparatus according to claim 1, wherein said binarization means includes means for performing binarization processing of an image signal read by said reading means in units of fields/frames.

10. An information reproduction apparatus according to claim 9, wherein said binarization means includes reference dot presence/absence discrimination means for discriminating the presence/absence of the reference dot in a field/frame image read by said reading means, and means for adaptively selecting a reference dot to be used for setting the threshold in accordance with a discrimination result obtained by said reference dot presence/absence discrimination means.

11. An information reproduction apparatus according to claim 10, wherein the means for adaptively selecting a reference dot selected to be used for setting the threshold comprises means for selecting a reference dot detected in a field/frame image which is included in the images already read by said reading means.

12. An information reproduction apparatus according to claim 10, wherein said binarization means includes means for performing binarization processing of an image signal read by said reading means in units of fields/frames, and means for applying one of the internal ratio and threshold set for the field/frame image by said binarization means to each image following the field/frame image.

13. An information reproduction apparatus according to claim 1, wherein an attribute dot containing information associated with said recording medium for setting the threshold is arranged in a predetermined area on a reading start end side of the dot code recorded on said recording medium, and wherein said binarization means includes attribute dot detection means for detecting the attribute dot, means for performing binarization processing of an image signal read by said reading means in units of fields/frames, and means for applying information associated with said recording medium which is detected by said attribute dot detection means for the field/frame image to each image following the field/frame image.

14. An information reproduction system comprising:

reading means for reading a dot code from a recording medium on which multimedia information including at least one of audio information, image information and digital code data is recorded as an optically readable dot code;

binarization means for binarizing an image signal corresponding to the dot code read by the reading means using a threshold so as to produce binary image data; and restoring means for restoring data as original multimedia information by reading a dot code from the binary image data produced by the binarization means, said recording medium including a plurality of reference dots used by said binarization means for determining said threshold, and said binarization means including:
reference dot detection means for detecting the reference dots; and
threshold setting means for determining an estimation value based on diameters of the reference dots detected by the reference dot detection means, for comparing the estimation value with a predetermined reference value, and for re-setting the threshold such that a difference between the estimation value and the predetermined reference value becomes equal to a predetermined target value.

15. An information reproduction system according to claim 14, wherein the dot code recorded on the recording medium includes a data code corresponding to the multimedia information and a pattern code used for determining a read reference point of the data code, and wherein said pattern code comprises the reference dots.

16. An information reproduction system according to claim 15, wherein said pattern code is used for determining a reference point which is referred to when a data code read point is determined, and wherein said pattern code includes a plurality of dots and a marker which is different in size from the dots.

17. An information reproduction apparatus according to claim 16, wherein said reference dot detection means includes marker detection means for detecting at least one of the markers of the optically read dot code.

18. An information reproduction apparatus according to claim 14, wherein said estimation value is an average value of the diameters of the reference dots.

19. An information reproduction apparatus according to claim 14, wherein said binarization means includes means for performing binarization processing of an image signal read by said reading means in units of fields/frames.

20. An information reproduction apparatus according to claim 18, wherein said binarization means includes reference dot presence/absence discrimination means for discriminating the presence/absence of the reference dot in a field/frame image read by said reading means, and means for adaptively selecting a reference dot to be used for setting the threshold in accordance with a discrimination result obtained by said reference dot presence/absence discrimination means.

21. An information reproduction apparatus according to claim 20, wherein the means for adaptively selecting a reference dot selected to be used for setting the threshold comprises means for selecting a reference dot detected in a field/frame image which is included in the images already read by said reading means.

22. An information reproduction apparatus according to claim 20, wherein said binarization means includes means for performing binarization processing of an image signal read by said reading means in units of fields/frames, and means for applying one of the internal ratio and threshold set for the field/frame image by said binarization means to each image following the field/frame image.

23. An information reproduction apparatus according to claim 14, wherein an attribute dot containing information associated with said recording medium for setting the threshold is arranged in a predetermined area on a reading start end side of the dot code recorded on said recording medium, and wherein said binarization means includes attribute dot detection means for detecting the attribute dot, means for performing binarization processing of an image signal read by said reading means in units of fields/frames, and means for applying information associated with said recording medium which is detected by said attribute dot detection means for the field/frame image to each image following the field/frame image.

24. An information reproduction system comprising:

reading means for reading a dot code from a recording medium on which multimedia information including at least one of audio information, image information and digital code data is recorded as an optically-readable dot code;

binarization means for binarizing an image signal corresponding to the dot code read by the reading means using a threshold so as to produce binary image data; and restoring means for restoring data as original multimedia information by reading a dot code from the binary image data produced by the binarization means, said recording medium including an attribute dot which contains information associated with the recording medium for setting the threshold, said attribute dot being arranged in a predetermined area on a reading start end side of the dot code, and said binarization means including:
  attribute dot detection means for detecting the attribute dot; and
  storage means for storing a correspondence between the information associated with said recording medium contained in the attribute dot and an internal ratio representing a ratio between maximum and minimum values of an image signal level,
wherein said information reproduction system further comprises threshold setting means for determining the internal ratio and setting the threshold based on the internal ratio and the maximum and minimum values of the image signal level.

25. An information reproduction apparatus according to claim 24, wherein the predetermined area comprises an empty area outside an end of the dot code, and wherein an indicator for indicating a scanning start position is set in the predetermined area.

26. An information reproduction apparatus according to claim 24, wherein the predetermined area comprises a header information recording area which is within a recording area of the dot code.

27. An information reproduction apparatus according to claim 24, wherein the information associated with said recording medium contained in the attribute dot comprises one of a material of said recording medium and an exposure amount recording state in a recording operation.

28. A recording medium for use in an information reproduction system that comprises:
  reading means for reading a dot code from a recording medium on which multimedia information including at least one of audio information, image information and digital code data is recorded as an optically-readable dot coda;
  binarization means for binarizing an image signal corresponding to the dot code read by the reading means using a threshold so as to produce binary image data; and
  restoring means for restoring data as original multimedia information by reading a dot code from the binary image data produced by the binarization means,
  wherein said recording medium comprises a plurality of reference dots to be used as a reference, and
  wherein said binarization means compares an estimation value calculated based on detected diameters of the reference dots with a predetermined reference value, and re-sets the threshold such that a difference between the estimation value and the predetermined reference value becomes equal to a predetermined target value.

29. A recording medium according to claim 28, wherein said reference dots are recorded in a predetermined area which is located on a reading start end side of the dot code.

30. A recording medium according to claim 29, wherein said predetermined area comprises an empty area outside a reading start and of the dot code.

31. A recording medium according to claim 30, further comprising a positioning frame used for positioning the information reproduction apparatus, said positioning frame being arranged to surround the reference dots recorded in the empty area outside the reading start end.

32. A recording medium according to claim 29, wherein said predetermined area is located within a recording area of the dot code.

33. A recording medium according to claim 28, wherein the dot code recorded on the recording medium includes a data code corresponding to the multimedia information and a pattern code for determining a reading reference point of the data code, and wherein the pattern code comprises the reference dots.

34. A recording medium according to claim 28, wherein the dot code recorded on the recording medium comprises a data code corresponding to the multimedia information, a pattern code for determining a reading reference point of the data code, and a marker contained in the pattern code having a size different from other dot code sizes.

35. A recording medium for use in an information reproduction system which comprises:
  reading means for reading a dot code from a recording medium on which multimedia information including at least one of audio information, image information and digital code data is recorded as an optically-readable dot coda;
  binarization means for binarizing an image signal corresponding to the dot code read by the reading means using a threshold so as to produce binary image data; and
  restoring means for restoring data as original multimedia information by reading a dot code from the binary image data produced by the binarization means,
  wherein said recording medium comprises a plurality of reference dots to be used as a reference, and
  wherein said binarization means detects maximum and minimum values of an image signal level corresponding to the dot code, determines an internal ratio representing a ratio between the maximum and minimum values, calculated the threshold using the internal ratio, the maximum value of the image signal level and the minimum value of the image signal level, compares an estimation value calculated based on detected diameters of the reference dots with a predetermined reference value, and re-sets the threshold by varying the internal ratio such that a difference between the estimation value and the predetermined reference value becomes equal to a predetermined target value.

36. A recording medium according to claim 35, wherein said reference dots are recorded in a predetermined area which is located on a reading start end side of the dot code.

37. A recording medium according to claim 36, wherein said predetermined area comprises an empty area outside a reading start end of the dot code.

38. A recording medium according to claim 37, further comprising a positioning frame used for positioning the information reproduction apparatus, said positioning frame being arranged to surround the reference dots recorded in the empty area outside the reading start end.

39. A recording medium according to claim 37, wherein said predetermined area is located within a recording area of the dot code.

40. A recording medium according to claim 35, wherein the dot code recorded on the recording medium includes a data code corresponding to the multimedia information and a pattern code for determining a reading reference point of the data code, and wherein the pattern code comprises the reference dots.

41. A recording medium according to claim 35, wherein the dot code recorded on the recording medium comprises a data code corresponding to the multimedia information, a pattern code for determining a reading reference point of the data code, and a marker contained in the pattern code having a size different from other dot code sizes.

42. A recording medium for use in an information reproduction system that comprises:

reading means for reading a dot code from a recording medium on which multimedia information including at least one of audio information, image information and digital code data is recorded as an optically-readable dot coda;

binarization means for binarizing an image signal corresponding to the dot code read by the reading means using a threshold so as to produce binary image data; and restoring means for restoring data as original multimedia information by reading a dot code from the binary image data produced by the binarization means, wherein said recording medium includes an attribute dot containing information associated with the recording medium, said attribute dot being recorded in at least a predetermined area on a reading start end of the dot code, and wherein said binarization means detects the attribute dot, sets an internal ratio based on a one-to-one correspondence between the information associated with said recording medium contained in the attribute dot and an internal ratio representing maximum and minimum values of an image signal level corresponding to the dot code, and sets the threshold used by the binarization means based on the internal ratio and the maximum and minimum values of the image signal level.

43. A recording medium according to claim 42, wherein said predetermined area comprises an empty area outside a reading start end of the dot code.

44. A recording medium according to claim 42, wherein said predetermined area is located within a recording area of the dot code.

45. A recording medium according to claim 42, wherein said attribute dot is recorded in a header information recording area which is located within a recording area of the dot area.

46. A recording medium according to claim 42, wherein the information associated with the recording medium contained in the attribute dot comprises one of a material of said recording medium and an exposure amount recording state in a recording operation.

47. A recording apparatus for recording multimedia information including at least one of audio information image information and digital code data on a recording medium as an optically readable dot code, said recording apparatus comprising:

reference dot recording means for recording at least two types of reference dots having different diameters;

reading means for reading the reference dots recorded by the reference dot recording means and for performing binarization processing of the image signals;

reference dot selection means for comparing a reference value with a diameter of each of the reference dots read and binarized by the reading means, and for selecting one of the reference dots which coincides closest to the reference value; and dot code recording means for recording a dot code corresponding to the multimedia information based on the reference dot selected by the reference dot selection means.

48. A recording apparatus according to claim 47, wherein said at least two types of reference dots recorded by the reference dot recording means are recorded such that diameters thereof change in predetermined steps each corresponding to a minimum resolution of the recording apparatus.

49. A recording apparatus for recording multimedia information including at least one of audio information, image information and digital code data on a recording medium as an optically readable dot code, said recording apparatus comprising:

reference dot recording means for recording reference dots having different recording densities; and reading means for reading the reference dots recorded by the reference dot recording means and for performing binarization processing of image signals;

wherein a reference value is compared with a diameter of each of the reference dots read by said reading means, and a recording density of said recording apparatus is adjusted such that a difference between the reference value and the diameter becomes equal to a predetermined target value, thereby recording a dot code corresponding to the multimedia information.

50. A recording apparatus for recording multimedia information including at least one of audio information image information and digital code data on a recording medium as an optically readable dot code, said recording apparatus comprising:

input means for inputting information associated with the recording medium; and storage means for storing a correspondence between predetermined information associated with the recording medium and at least one of a dot diameter and density to be used at a time of recording, wherein said at least one of said dot diameter and density are read out from said storage means based on the information associated with the recording medium input by the input means, and wherein a recording operation is performed using said at least one of said read dot diameter and density.

* * * * *

UNITED STATES PATENT AND TRADEMARK OFFICE
CERTIFICATE OF CORRECTION

PATENT NO. : 6,119,937  Page 1 of 1
DATED : September 19, 2000
INVENTOR(S) : Kangda Wang et al.

It is certified that error appears in the above-identified patent and that said Letters Patent is hereby corrected as shown below:

Title page,
Item [56] References Cited,
Under "FOREIGN PATENT DOCUMENTS",
    insert -- 57-132278    8/1982    Japan
              63-171477    7/1988    Japan OTHER PUBLICATIONS
Abstract of PCT WO 94/08314, publication date April 14, 1994. --.

Signed and Sealed this

Twentieth Day of November, 2001

Attest:

NICHOLAS P. GODICI
Attesting Officer    Acting Director of the United States Patent and Trademark Office